US011153862B2

(12) United States Patent
He et al.

(10) Patent No.: US 11,153,862 B2
(45) Date of Patent: Oct. 19, 2021

(54) PHYSICAL DOWNLINK CONTROL CHANNEL (PDCCH) BLIND DECODING IN FIFTH GENERATION (5G) NEW RADIO (NR) SYSTEMS

(71) Applicant: Apple Inc., Cupertino, CA (US)

(72) Inventors: Hong He, Sunnyvale, CA (US); Debdeep Chatterjee, San Jose, CA (US); Gang Xiong, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/361,981

(22) Filed: Mar. 22, 2019

(65) Prior Publication Data

US 2019/0223164 A1   Jul. 18, 2019

Related U.S. Application Data

(60) Provisional application No. 62/646,597, filed on Mar. 22, 2018.

(51) Int. Cl.
*H04W 72/04* (2009.01)
*H04W 24/08* (2009.01)
*H04W 76/27* (2018.01)
*H04W 76/11* (2018.01)
*H04W 48/16* (2009.01)
*H04L 5/00* (2006.01)

(52) U.S. Cl.
CPC .............. *H04W 72/042* (2013.01); *H04L 5/00* (2013.01); *H04W 24/08* (2013.01); *H04W 48/16* (2013.01); *H04W 76/11* (2018.02); *H04W 76/27* (2018.02); *H04L 5/001* (2013.01)

(58) Field of Classification Search
CPC ... H04W 72/042; H04W 76/11; H04W 76/27; H04W 24/08; H04W 48/16; H04L 5/00; H04L 5/001
USPC ......................................................... 370/329
See application file for complete search history.

(56) References Cited

U.S. PATENT DOCUMENTS

| 8,565,254 | B2* | 10/2013 | Okubo | ..................... H04L 5/003 370/437 |
| 10,448,389 | B1* | 10/2019 | Seo | .......................... H04L 25/02 |
| 2012/0039285 | A1* | 2/2012 | Seo | ........................ H04L 1/0668 370/329 |

(Continued)

*Primary Examiner* — Christopher R Crompton
(74) *Attorney, Agent, or Firm* — Eschweiler & Potashnik, LLC

(57) ABSTRACT

A network device (e.g., a user equipment (UE), or a new radio NB (gNB)) can process or generate a configuration of physical downlink control channel (PDCCH) monitoring in different search spaces sets independently from one another in order to manage different services optimally. A processor of the network device can be configured to receive physical downlink control channel (PDCCH) candidates of a PDCCH in a slot for channel estimation across search spaces of the slot. Different priorities can be determined among the PDCCH candidates in the slot based on a priority rule. Then a number of PDCCH candidates can be skipped/dropped from monitoring based on the different priorities of the PDCCH candidates to ensure that a threshold level of blind decoding operations across a plurality of slots of the PDCCH is being satisfied. The UE can monitor a portion of the PDCCH candidates while concurrently skipping another.

23 Claims, 11 Drawing Sheets

(56) References Cited

U.S. PATENT DOCUMENTS

| | | | |
|---|---|---|---|
| 2015/0189633 A1* | 7/2015 | Oizumi | H04L 5/0094 |
| | | | 370/329 |
| 2019/0215098 A1* | 7/2019 | Tiirola | H04W 72/0446 |
| 2019/0254025 A1* | 8/2019 | Lee | H04L 5/0053 |
| 2019/0268206 A1* | 8/2019 | Yang | H04L 27/2666 |

* cited by examiner

PHYSICAL DOWNLINK CONTROL CHANNEL (PDCCH) BLIND DECODING IN FIFTH GENERATION (5G) NEW RADIO (NR) SYSTEMS

REFERENCE TO RELATED APPLICATIONS

This application claims the benefit of U.S. Provisional Application No. 62/646,597 filed Mar. 22, 2018, entitled "PHYSICAL DOWNLINK CONTROL CHANNEL (PDCCH) BLIND DECODING IN FIFTH GENERATION (5G) NEW RADIO SYSTEMS", the contents of which are herein incorporated by reference in their entirety.

FIELD

The present disclosure relates to wireless technology, and more specifically to techniques for physical downlink control channel generation and blind decoding for new radio (NR) systems or network devices of an NR network.

BACKGROUND

The Bandwidth Part (BWP) was introduced in Fifth Generation (5G) new radio (NR) systems, targeting to flexibly and dynamically configure User Equipment (UE) operating bandwidth to achieve power efficiency.

In general, a UE can monitor a set of Physical Downlink Control Channel (PDCCH) candidates in one or more control resource sets (CORESETs) on an active downlink (DL) BWP on each activated serving cell according to corresponding search spaces, where monitoring implies or refers to decoding (or attempting to decode) some or all PDCCH candidates in the PDCCH candidate set according to the monitored Downlink Control Information (DCI) formats. A set of PDCCH candidates for a UE to monitor can be defined in terms of PDCCH search spaces. A search space can be a common search space (CSS) or a UE-specific search space (USS). According to current NR implementations, a UE can monitor PDCCH candidates in non-discontinuous reception (DRX) slots (or slots) in one or more of the various defined search spaces.

For PDCCH monitoring purposes, each BWP configured to a UE can be associated with up to about three control resource sets (CORESETs) and up to ten search space sets. In particular, the number of PDCCH candidates per aggregation level (AL) can be independently configured among {0, 1, 2, 3, 4, 5, 6, 8} for each search space (SS). Monitoring periodicities of different SS sets can be different and be selected from a set of possible values given as {1, 2, 4, 5, 8, 10, 16, 20} slots, for example.

Ideally, a UE could be capable of monitoring PDCCH candidates configured by the next generation NodeB (gNB) so that the most/optimal scheduling flexibility can be achieved. However, due to the terminal complexity and cost concerns, the maximum number of blind decoding attempts and number of control channel elements (CCEs) for channel estimation in a UE can be limited.

DETAILED DESCRIPTION

Figure 1:
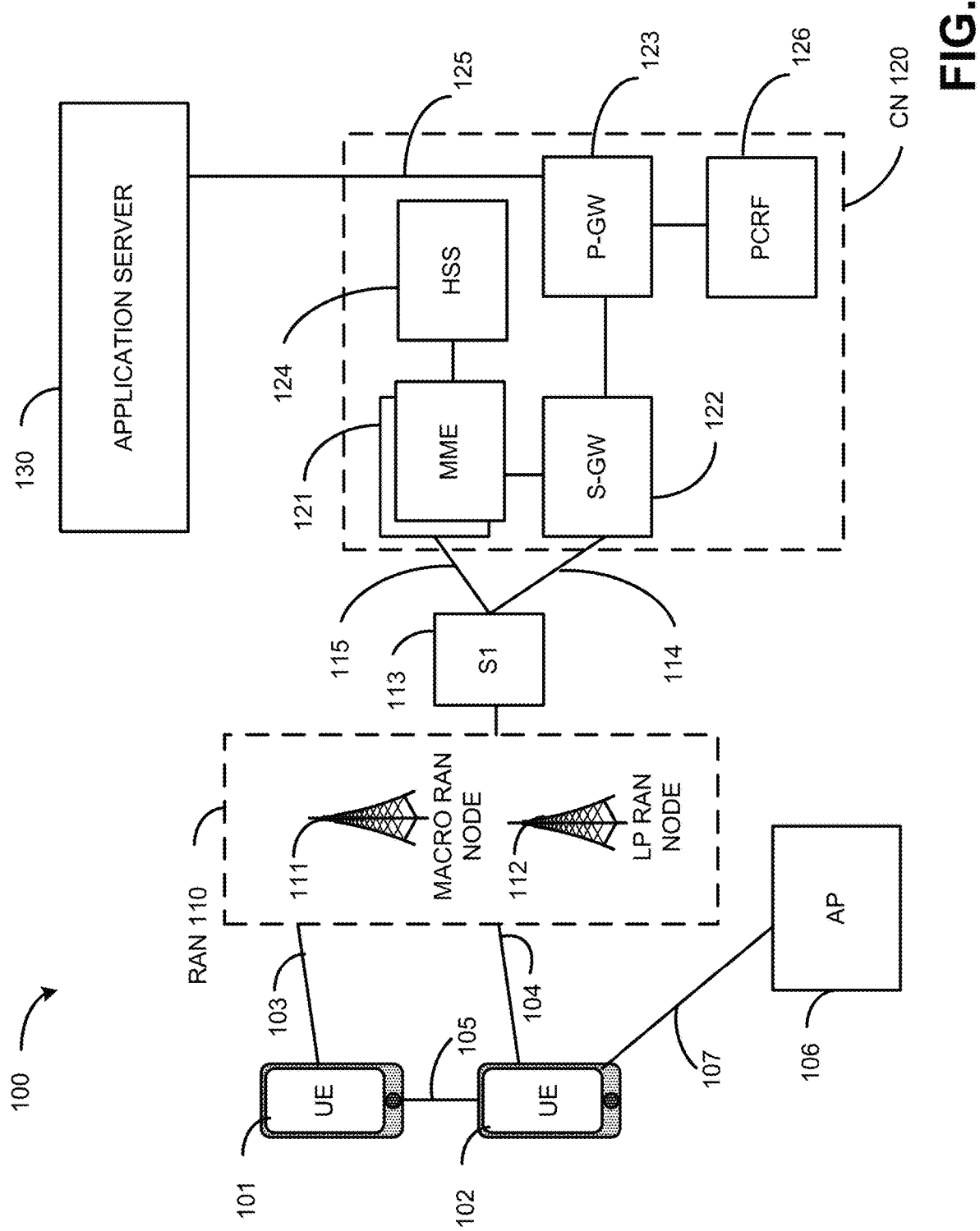
FIG. 1 is a block diagram illustrating an example user equipments (UEs) in a network with network components useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

In consideration of various deficiencies or solutions described herein, the present disclosure provides various embodiments/aspects for skipping PDCCH candidates for monitoring in a radio communication system. For example, a processing device (e.g., UE or gNB) with a controller/processor for processing wireless communications can identify a particular number of PDCCH candidates and a number of CCEs for channel estimations across search spaces sets for the common search spaces (CSS) and UE-specific search spaces (USS) in a slot. This identification can be based on the higher layer configurations, by an indication signaled or one or more criteria, for example. The device can determine whether the total number of PDCCH candidates or a total number of CCEs exceeds the maximum values defined in 3GPP specification. This determination can be applied to and vary as a function of each slot, for example.

Upon determining that the total number of PDCCH candidates or total number of CCEs exceeds the corresponding maximum value, the processor can select one or more PDCCH candidates as a subset from among a plurality of PDCCH candidates as based on a priority rule. The UE can then be configured to skip monitoring the selected PDCCH candidate within each slot that have a lower priority relative to other PDCCH candidates of the slot according to the priority rule.

The priority rule, for example, can be based on the search space type i.e. CSS or USS, or other criteria. If there are multiple CSSs or USSs with a same priority in a time instance, then these search spaces can be further prioritized based on the search space set index, which can be configured for each SS by higher layers, an indication, or priority criteria, for example. In another example, the AL of the PDCCH can be a part of the criteria for determining priority, where a higher aggregation level (AL) can have higher priority than PDCCH candidates with lower ALs within a given search space set, for example, or vice versa, the PDCCH with a lower aggregation level (AL) have higher priority than PDCCH candidates with higher ALs within a given search space set.

A 2-step mechanism can be enabled for dropping of PDCCH candidates comprising, where the processor or UE can drop candidates as specified to start with the candidates at the lowest ALs within the search space set to first reduce the number of BDs, and when a BD-budget is satisfied, dropping or causing to drop the PDCCH candidate at highest ALs to satisfy a CCE-budget or defined capacity.

Alternatively, or additionally, the processor can compute a priority factor for each PDCCH candidate in the USS. Based on the values of the priority order, monitoring can be skipped for a set of PDCCH candidates in a multiple CORESETS and UE-specific search spaces selected. An iteration from the first step here can be done with re-calculating priority factor to select the PDCCH candidates for dropping or skip monitoring until the number of PDCCH candidates and the number of CCEs for channel estimation fit within the maximum values. This priority factor can be defined as) $\beta(p,s,L)=1/M_{p,s}^{(L)}$, wherein p is the control resource set index; s represents the search space index $0 \leq s \leq 9$; $L \in \{1,2,4,8,16\}$ is the aggregation level; and $M_{p,s}^{(L)}$: number of PDCCH candidates for AL L within search space index s of control resource set p. For an AL L, if $M_{p,s}^{(L)}=0$, then $\beta(p,s,L)=1$. As such, the PDCCH candidates within the smallest $\beta(p,s,L)$ across all the involved search spaces sets in the given slot could be selected for being dropped or skipped from monitoring.

If multiple PDCCH candidates with a same or different ALs were selected due to a same value of priority order, the processor or device, for example, can select the dropped PDCCH candidates at least based on aggregation levels (ALs), PDCCH candidate index, search space index, CORESET index or a combination of thereof. The PDCCH candidate with lower (or higher) AL and lower (or higher) PDCCH candidate index in the SS with lower or higher index can be selected for dropping. In other aspects, the PDCCH candidate in the lower AL that reduces the largest number of CCEs in the slot can be selected for dropping. The priority factor can be defined as $\theta(p,s,L)=1/(L*M_{p,s}^{(L)})$, wherein L denotes the AL value of PDCCH candidate.

In an aspect, the process or device can determine the BDs for a search space based on PDCCH candidates of all USS configured by RRC signaling and the maximum number of PDCCH candidates attempts in the UE-specific Search Space (USS) per slot. Additionally, or alternatively, the maximum number of CCEs for channel estimation for this search space can be determined based on all CCEs across all the USS CORESETs and the maximum number of CCEs defined in a 3GPP specification.

The following representation can denote the number of BDs for AL L in a UE-specific search space $s_{uss}$ ($0 \leq s_{uss} < S_{uss}$) and CCEs for a CORESET $p_{uss}$ ($0 \leq p_{uss} < P_{uss}$) by $M_{p_{uss},s_{uss}}^{(L)}$, and $C_{PDCCH}^{p_{uss}}$ respectively. Then the scaled value of $M_{p_{uss},s_{uss}}^{(L)'}$ and the size of $C_{PDCCH}^{p'}$ is given by:

$$M_{P_{uss},s_{uss}}^{(L)'} = \left\lfloor \frac{M_{PDCCH}^{max,slot} \cdot M_{P_{uss},s_{uss}}^{(L)}}{S_{uss} \cdot \sum_L M_{P_{uss},s_{uss}}^{(L)}} \right\rfloor; C_{PDCCH}^{P_{uss'}} = \left\lfloor \frac{c_{PDCCH}^{P_{uss}}}{P_{uss}} \right\rfloor;$$

wherein $M_{P_{uss},s_{uss}}^{(L)}$ is the PDCCH candidates of AL L configured by RRC signaling for search space $s_{uss}$ in CORESET $p_{uss}$ before scaling; $M_{PDCCH}^{max,slot}$ denotes the maximum number of PDCCH candidates attempts in the UE-specific Search Space per slot and per serving cell; $C_{PDCCH}^{P_{uss}}$ denotes the maximum number of CCEs for channel estimation across all the $P_{uss}$ CORESETS; $S_{uss}$ is the total number of UE-specific SS; $P_{uss}$ is the total number of CORESETS consisting of UE-specific SS; $M_{P_{uss},s_{uss}}^{(L)'}$ is the actual number of blind decoding for USS $s_{uss}$; $C_{PDCCH}^{P_{uss'}}$ is the actual number of CCEs for channel estimation for USS $s_{uss}$.

In another alternative, the PDCCH candidates for AL L could be determined according to the following representation for all UE-specific SS:

$$M_{P_{uss},s_{uss}}^{(L)'} = \left\lfloor \frac{M_{P_{uss},s_{uss}}^{(L)} \cdot M_{PDCCH}^{max,slot}}{\sum_{P_{uss}} \sum_{s_{uss}} \sum_L M_{P_{uss},s_{uss}}^{(L)}} \right\rfloor,$$

wherein $M_{P_{uss},s_{uss}}^{(L)}$ the PDCCH candidates of AL L configured by RRC signaling for search space $s_{uss}$ in CORESET $p_{uss}$ before scaling; $M_{PDCCH}^{max,slot}$ denote the maximum number of PDCCH candidates attempts in the UE-specific Search Space per slot and per serving cell; $S_{uss}$ is the total number of UE-specific SS; and $M_{P_{uss},s_{uss}}^{(L)'}$ is the actual number of blind decoding for USS $s_{uss}$.

In other aspects, the UE can take into account the following relative priority in decreasing order for CSS: Type 0-PDCCH CSS for a downlink control information (DCI) format with CRC scrambled by a system information (SI) radio network temporary identifier (RNTI) (SI-RNTI); Type 1-PDCCH CSS for a DCI format with CRC scrambled by a random access RNTI (RA-RNTI); Type 2-PDCCH CSS for a DCI format with CRC scrambled by a paging RNTI (P-RNTI); Type 3-PDCCH CSS for a DCI format with CRC scrambled by interruption RNTI (INT-RNTI), or slot format indication RNTI (SFI-RNTI), or transmit power control (TPC) physical uplink shared channel (PUSCH) RNTI (TPC-PUSCH-RNTI), or TPC-physical uplink control channel (PUCCH)-RNTI, or TPC-sounding reference symbols (SRS)-RNTI, or cell RNTI (C-RNTI), or configured scheduling RNTI(s) (CS-RNTI(s), or temporary cell (TC) RNTI (TC-RNTI), or semi-persistent channel state information RNTI (SP-CSI-RNTI).

For example, the order for the CSS can comprise: SI-RNTI>P-RNTI>RA-RNTI>other RNTIs in Type 3-PDCCH CSS. For carrier aggregation (CA) cases, the priority can be as follows: the CC Index (lowest CC index has higher priority)>BWP index (lowest BWP index has higher priority)>CSS>USS, or it can be CC Index>CSS>BWP>USS, for example.

Additional aspects and details of the disclosure further described below with reference to figures.

Embodiments described herein can be implemented into a system or network device using any suitably configured hardware and/or software. FIG. 1 illustrates an architecture of a system 100 of a network in accordance with some embodiments. The system 100 is illustrated to include a UE 101 and a UE 102, which can further represent new radio (NR) devices as discussed herein.

In embodiments or aspects, any one or more of the UEs 101 and 102 can comprise a vehicular/drone/Internet of Things (IoT) UE device or IoT device, which can comprise a network access layer. These devices can also utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 101 and 102 can be configured to connect, communicatively couple, or operably couple with a radio access network (RAN) 110—the RAN 110 can be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 can further directly exchange communication data via a ProSe interface 105. The ProSe interface 105 can alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, as well as vehicle network nodes including V2X nodes or the like. They can be referred to as RAN nodes herein and also comprise ground stations (e.g., terrestrial access points) or satellite stations providing coverage within a geographic area (e.g., a cell). The RAN 110 can thus include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

The physical downlink shared channel (PDSCH) can carry user data and higher-layer signaling to the UEs 101 and 102. The physical downlink control channel (PDCCH) can carry information about the transport format and resource allocations related to the PDSCH channel, among other things. It can also inform the UEs 101 and 102 about the transport format, resource allocation, and Hybrid Automatic Repeat Request (H-ARQ) information related to the uplink shared channel. Typically, downlink scheduling (assigning control and shared channel resource blocks to the UE 102 within a cell) can be performed at any of the RAN nodes 111 and 112 based on channel quality information fed back from any of the UEs 101 and 102. The downlink resource assignment information can be sent on the PDCCH used for (e.g., assigned to) each of the UEs 101 and 102.

The PDCCH can use control channel elements (CCEs) to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as resource element groups (REGs). Four Quadrature Phase Shift Keying (QPSK) symbols can be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, 8, 16).

Some embodiments can use concepts for resource allocation for control channel information that are an extension of the above-described concepts. For example, some embodiments can utilize an enhanced physical downlink control channel (EPDCCH (or ePDCCH)) that uses PDSCH resources for control information transmission. The EPDCCH can be transmitted using one or more enhanced the control channel elements (ECCEs). Similar to above, each ECCE can correspond to nine sets of four physical resource elements known as an enhanced resource element groups (EREGs). An ECCE can have other numbers of EREGs in some situations.

The RAN 110 is shown to be communicatively coupled to a core network (CN) 120—via an S1 interface 113. In embodiments, the CN 120 can be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 can be similar in function to the control plane of legacy Serving General Packet Radio Service (GPRS) Support Nodes (SGSN). The MMEs 121 can manage mobility aspects in access such as gateway selection and tracking area list management. The HSS 124 can comprise a database for network users, including subscription-related information to support the network entities' handling of communication sessions. The CN 120 can comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 can terminate the S1 interface 113 towards the RAN 110, and routes data packets between the RAN 110 and the CN 120. In addition, the S-GW 122 can be a local mobility anchor point for inter-RAN node handovers and also can provide an anchor for inter-3GPP mobility. Other responsibilities can include lawful intercept, charging, and some policy enforcement.

The P-GW 123 can terminate an SGi interface toward a PDN. The P-GW 123 can route data packets between the EPC network 123 and external networks such as a network including the application server 130 (alternatively referred to as application function (AF)) via an Internet Protocol (IP) interface 125. Generally, the application server 130 can be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 can further be a node for policy enforcement and charging data collection. Policy and Charging Enforcement Function (PCRF) 126 is the policy and charging control element of the CN 120. In a non-roaming scenario, there can be a single PCRF in the Home Public Land Mobile Network (HPLMN) associated with a UE's Internet Protocol Connectivity Access Network (IP-CAN) session. In a roaming scenario with local breakout of traffic, there can be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 can be communicatively coupled to the application server 130 via the P-GW 123. The application server 130 can signal the PCRF 126 to indicate a new service flow and select the appropriate Quality of Service (QoS) and charging parameters. The PCRF 126 can provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
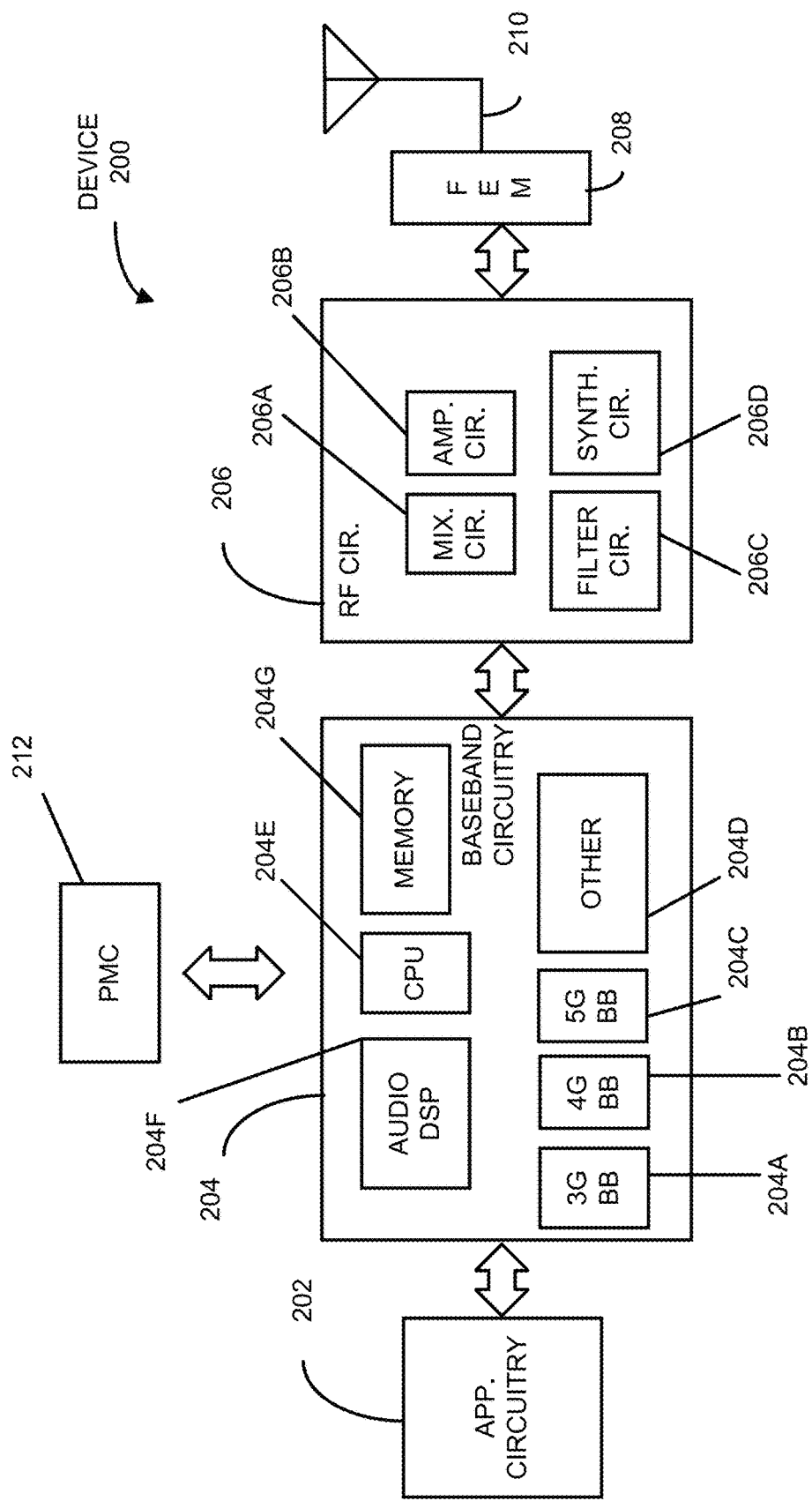
FIG. 2 is a diagram illustrating example components of a device that can be employed in accordance with various aspects discussed herein.

FIG. 2 illustrates example components of a device 200 in accordance with some embodiments. In some embodiments, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE or a RAN node, such as UE 101/102, or eNB/gNB 111/112. In some embodiments, the device 200 can include less elements (e.g., a RAN node can not utilize application circuitry 202, and instead include a processor/controller to process IP data received from an EPC). In some embodiments, the device 200 can include additional elements such as, for example, memory/storage, display, camera, sensor, or input/output (I/O) interface. In other embodiments, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some embodiments, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuitry 204 can interface with the application circuitry 202 for generation and processing of the baseband signals and for controlling operations of the RF circuitry 206. For example, in some embodiments, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other embodiments, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some embodiments, modulation/demodulation circuitry of the baseband circuitry 204 can include Fast-Fourier Transform (FFT), precoding, or constellation mapping/demapping functionality. In some embodiments, encoding/decoding circuitry of the baseband circuitry 204 can include convolution, tail-biting convolution, turbo, Viterbi, or Low Density Parity Check (LDPC) encoder/decoder functionality. Embodiments of modulation/demodulation and encoder/decoder functionality are not limited to these examples and can include other suitable functionality in other embodiments.

Figure 4:
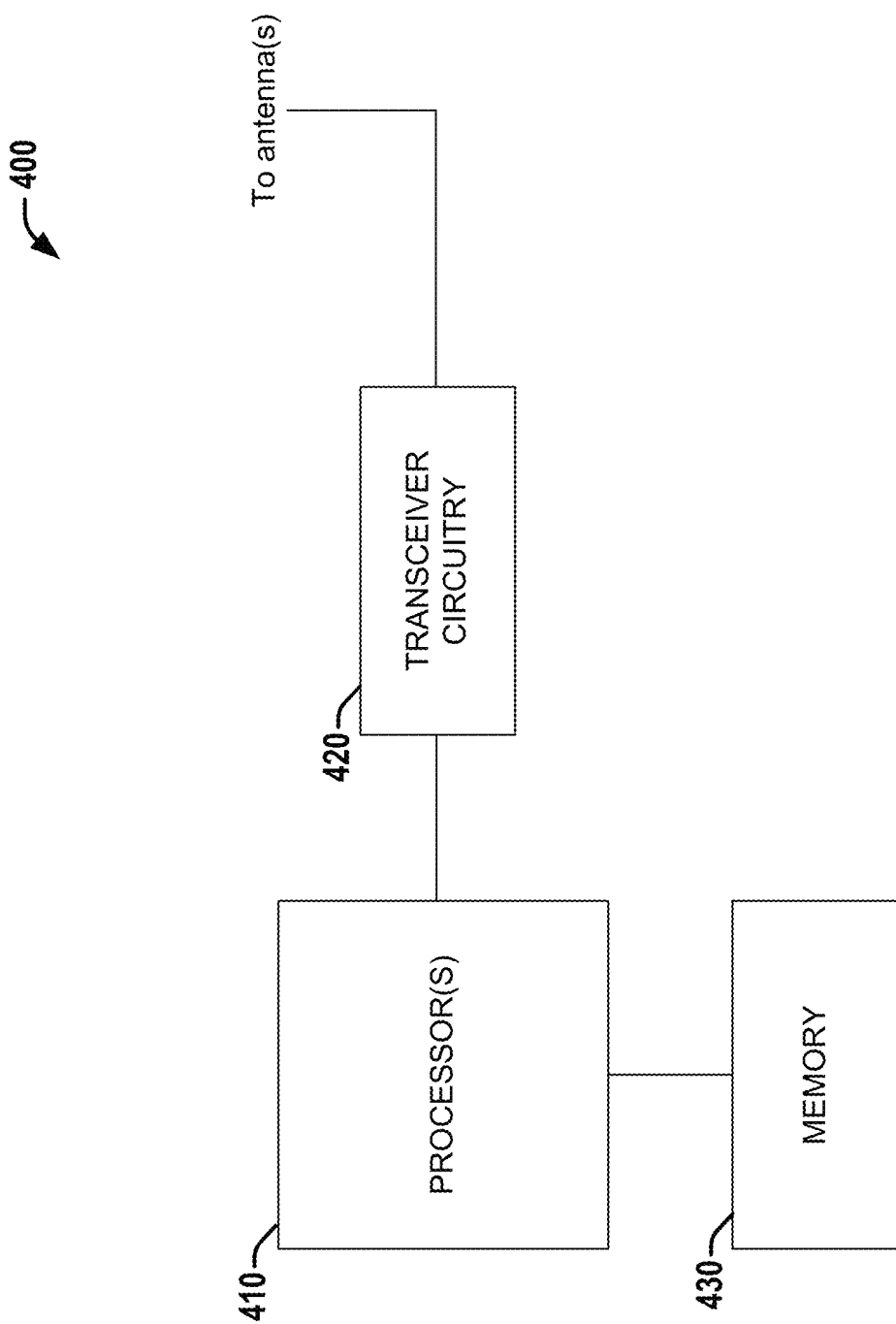
FIG. 4 is a block diagram illustrating a system employable at a UE according to various aspects described herein.
Figure 5:
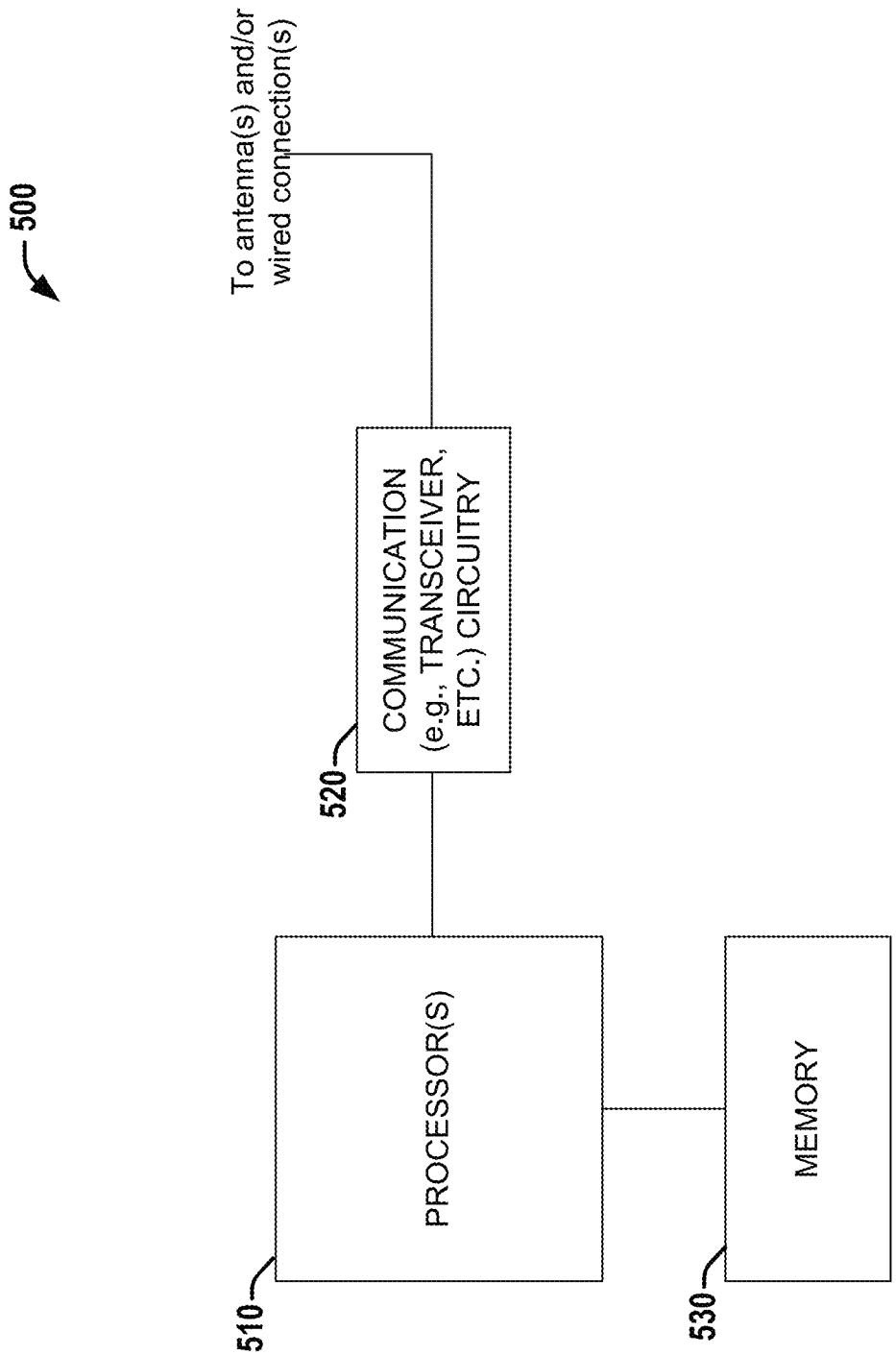
FIG. 5 is a block diagram illustrating a system employable at a BS (Base Station) according to various aspects described herein.

In addition, the memory 204G (as well as other memory components discussed herein, e.g., memory 430 of FIG. 4, memory 530 of FIG. 5 or the like) can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium.

In some embodiments, the baseband circuitry 204 can include one or more audio digital signal processor(s) (DSP) 204F. The audio DSP(s) 204F can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 204 and the application circuitry 202 can be implemented together such as, for example, on a system on a chip (SOC).

In some embodiments, the baseband circuitry 204 can provide for communication compatible with one or more radio technologies. For example, in some embodiments, the baseband circuitry 204 can support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various embodiments, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some embodiments, the receive signal path of the RF circuitry 206 can include mixer circuitry 206a, amplifier circuitry 206b and filter circuitry 206c. In some embodiments, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some embodiments, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some embodiments, the output baseband signals can be zero-frequency baseband signals, although this is not a requirement. In some embodiments, mixer circuitry 206a of the receive signal path can comprise passive mixers, although the scope of the embodiments is not limited in this respect.

In some embodiments, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some embodiments, the mixer circuitry 206a of the receive signal path and the mixer circuitry 206a of the transmit signal path can include two or more mixers and can be arranged for quadrature downconversion and upconversion, respectively. In some embodiments, the mixer circuitry 206a of the receive signal path and the mixer circuitry 206a of the transmit signal path can include two or more mixers and can be arranged for image rejection (e.g., Hartley image rejection). In some embodiments, the mixer circuitry 206a of the receive signal path and the mixer circuitry 206a can be arranged for direct downconversion and direct upconversion, respectively. In some embodiments, the mixer circuitry 206a of the receive signal path and the mixer circuitry 206a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode embodiments, a separate radio IC circuitry can be provided for processing signals for each spectrum, although the scope of the embodiments is not limited in this respect.

In some embodiments, the synthesizer circuitry 206d can be a fractional-N synthesizer or a fractional N/N+1 synthesizer, although the scope of the embodiments is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some embodiments, the synthesizer circuitry 206d can be a fractional N/N+1 synthesizer.

In some embodiments, frequency input can be provided by a voltage-controlled oscillator (VCO), although that is not a requirement. Divider control input can be provided by either the baseband circuitry 204 or the applications processor 202 depending on the desired output frequency. In some embodiments, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various embodiments, the amplification through the transmit or receive signal paths can be done solely in the RF circuitry 206, solely in the FEM 208, or in both the RF circuitry 206 and the FEM 208.

In some embodiments, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other embodiments, the PMC 212 can be additionally or alternatively coupled with, and perform similar power management operations for, other components such as, but not limited to, application circuitry 202, RF circuitry 206, or FEM 208.

In some embodiments, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 can not receive data in this state, in order to receive data, it must transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used to execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 3:
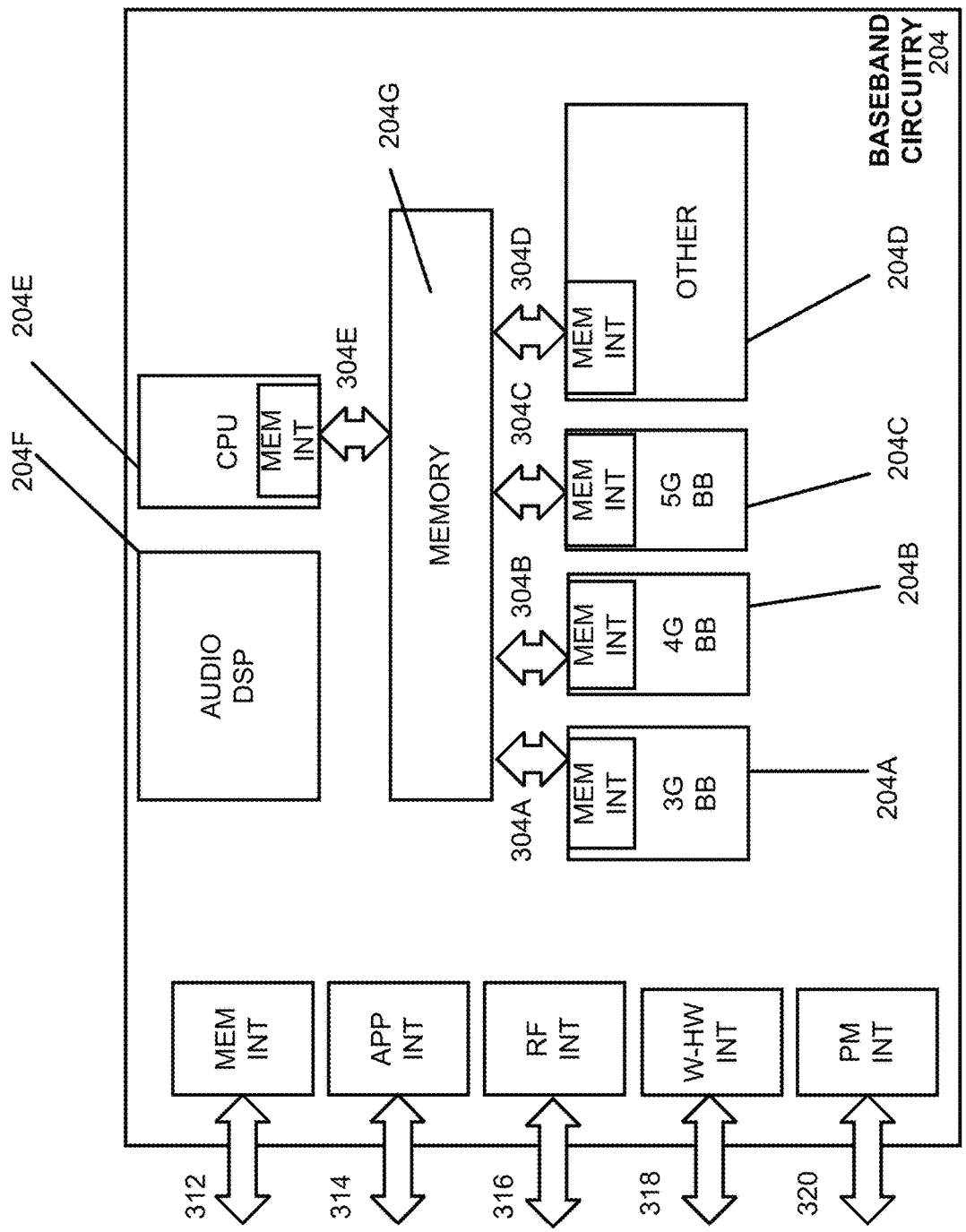
FIG. 3 is a diagram illustrating example interfaces of baseband circuitry that can be employed in accordance with various aspects discussed herein.

FIG. 3 illustrates example interfaces of baseband circuitry in accordance with some embodiments. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Referring to FIG. 4, illustrated is a block diagram of a system/device 400 employable at a UE or other network device (e.g., UE 101/102) that facilitates DCI configurations to reduce the decoding complexity and signaling overhead for 5G NR devices as UE 101/102, for example. System 400 can include one or more processors 410 (e.g., one or more baseband processors such as one or more of the baseband processors discussed in connection with FIG. 2 and/or FIG. 3) comprising processing circuitry and associated interface(s) (e.g., one or more interface(s) discussed in connection with FIG. 3), transceiver circuitry 420 (e.g., comprising part or all of RF circuitry 206, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 430 (which can comprise any of a variety of storage mediums and can store instructions and/or data associated with one or more of processor(s) 410 or transceiver circuitry 420).

Referring to FIG. 5, illustrated is a block diagram of a system 500 employable at a Base Station (BS), eNB, gNB or other network device (e.g., aV2X node as eNB/gNB 111/

112) that can enable generation and processing of configurable search spaces and related resources (e.g., times, time instances, CCEs, aggregation levels, or the like) for one or more UEs (e.g., URLLC UEs, or non-URLLC UEs) according to various aspects described herein. System 500 can include one or more processors 510 (e.g., one or more baseband processors such as one or more of the baseband processors discussed in connection with FIG. 2 and/or FIG. 3) comprising processing circuitry and associated interface(s) (e.g., one or more interface(s) discussed in connection with FIG. 3), communication circuitry 520 (e.g., which can comprise circuitry for one or more wired (e.g., X2, etc.) connections and/or part or all of RF circuitry 206, which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 530 (which can comprise any of a variety of storage mediums and can store instructions and/or data associated with one or more of processor(s) 510 or communication circuitry 520). In various aspects, system 500 can be included within an Evolved Universal Terrestrial Radio Access Network (E-UTRAN) Node B (Evolved Node B, eNodeB, or eNB), next generation Node B (gNodeB or gNB) or other base station or TRP (Transmit/Receive Point) in a wireless communications network. In some aspects, the processor(s) 510, communication circuitry 520, and the memory 530 can be included in a single device, while in other aspects, they can be included in different devices, such as part of a distributed architecture.

Figure 6:
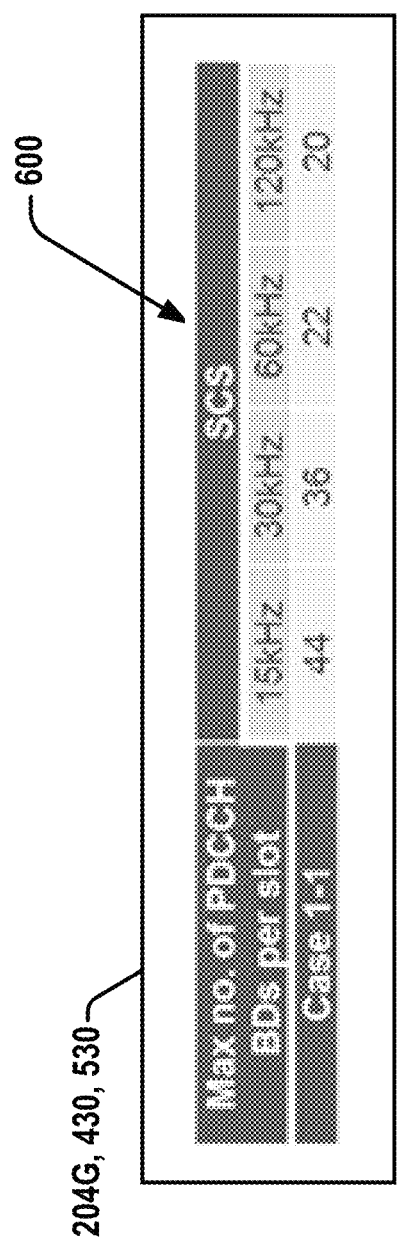
FIG. 6 is a block diagram illustrating a blind decoding attempts per slot for slot-based scheduling according to various aspects discussed herein.

FIG. 6 is a diagram illustrating table 600 that can be comprised by memory of a network device for determining or assessing blind decoding attempts/operations per slot for slot-based scheduling to schedule DL grants, UL grants, symbols or other communication resources in 5G or new radio (NR) specifications. Scheduling can be done on a subframe basis for both downlink and uplink resources, for example, where each subframe comprises two equally sized slots and in turn include a number of orthogonal frequency division modulation (OFDM) symbols.

Memory 204G, 430, or 530, for example, can include the table 600. A UE 400, for example, can monitor a set of PDCCH candidates in one or more control resource sets (CORESETs) on an active DL BWP on each activated serving cell according to corresponding search spaces, where monitoring implies decoding (or attempting to decode) some or all PDCCH candidates in the PDCCH candidate set according to the monitored Downlink Control Information (DCI) formats or types. A set of PDCCH candidates for the UE 400 to monitor can be defined in terms of PDCCH search spaces. A search space can be a CSS or a USS. According to current NR implementations, a UE can monitor PDCCH candidates in non-discontinuous reception (DRX) slots in one or more of the following search spaces, for example: Type 0-PDCCH CSS for a DCI format with cyclic redundancy check (CRC) scrambled by a system information (SI) radio network temporary identifier (RNTI) (SI-RNTI); Type 1-PDCCH CSS for a DCI format with CRC scrambled by a random access RNTI (RA-RNTI); Type 2-PDCCH CSS for a DCI format with CRC scrambled by a paging RNTI (P-RNTI); Type 3-PDCCH CSS for a DCI format with CRC scrambled by interruption RNTI (INT-RNTI), or slot format indication RNTI (SFI-RNTI), or transmit power control (TPC) physical uplink shared channel (PUSCH) RNTI (TPC-PUSCH-RNTI), or TPC-physical uplink control channel (PUCCH)-RNTI, or TPC-sounding reference symbols (SRS)-RNTI, or cell RNTI (C-RNTI), or configured scheduling RNTI(s) (CS-RNTI(s), or temporary cell (TC) RNTI (TC-RNTI), or semi-persistent channel state information RNTI (SP-CSI-RNTI), and UE-specific search space for a DCI format with CRC scrambled by C-RNTI or CS-RNTI(s).

For PDCCH monitoring purposes, each BWP configured to a UE can be associated with up to three control resource sets (CORESETs) and up to ten search space sets. In particular, the number of PDCCH candidates per aggregation level (AL) can be independently configured among {0, 1, 2, 3, 4, 5, 6, 8} for each SS. Monitoring periodicities of different SS (or SS sets) can be different and be selected from a set of possible values given as {1, 2, 4, 5, 8, 10, 16, 20} slots. A UE 400 could be capable of monitoring PDCCH candidates configured by gNB 500 so that the most scheduling flexibility can be achieved. However, due to the terminal complexity and cost concerns, the maximum number of blind decoding attempts and number of control channel elements (CCEs) for channel estimation in a UE is typically limited. For NR, UEs (e.g., 400, 101, or 102) can support channel estimation capability for following numbers of CCEs for a given slot per scheduled cell for slot-based scheduling depending on the subcarrier spacing (SCS), for example, as follows: 56 CCEs for SCS=15 kHz and 30 kHz; 48 CCEs for SCS=60 kHz; and 32 CCEs for SCS=120 kHz.

The number of CCEs for PDCCH channel estimation can refer to a union of the sets of CCEs for PDCCH candidates to be monitored, regardless of which Resource Element Group (REG)-bundle size or pre-coder granularity. Furthermore, the maximum number of PDCCH BDs per slot can be agreed to according to table 600, taking into account the tradeoff between scheduling flexibility and UE complexity aspects.

NR communication systems or NR capable network devices support a vast variety of services, and corresponding search space sets can use different PDCCH monitoring periodicities. To manage different services in an optimal manner, the UE 400 or gNB 500, for example, can configure via one or more processors PDCCH monitoring in different search space sets independently from each other. As a consequence, the number of BDs configured for a given UE 400, for example, can vary from slot to slot, such as, for example, according to the number of search space sets monitored in the slot.

Figure 7:
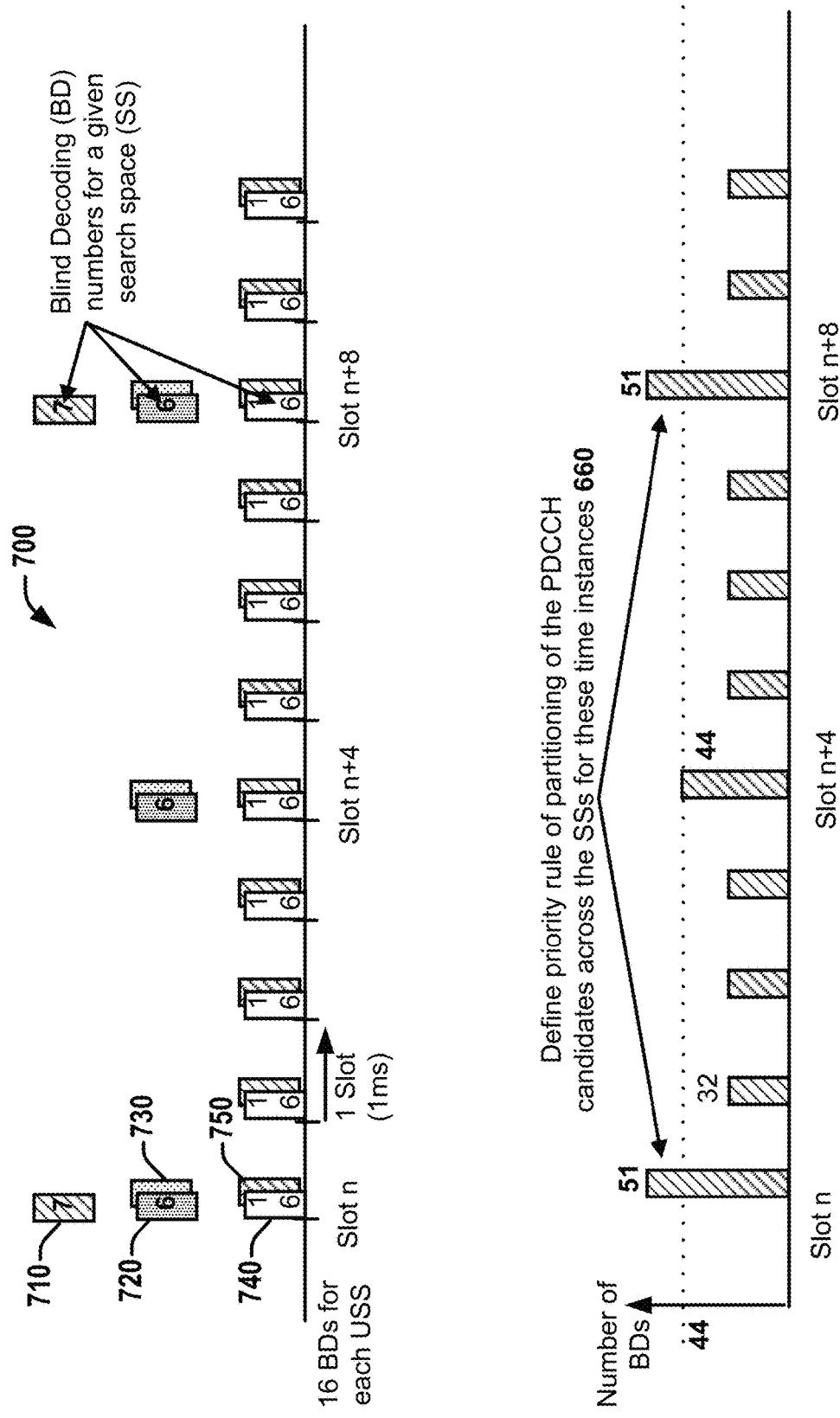
FIG. 7 is a diagram illustrating an example of NR PDCCH candidate overbooking according to various aspects discussed herein.

FIG. 7 is a diagram illustrating an overbooking of PDCCH blind decoding operations in accord with various aspects for NR communications.

In NR, the BDs of a respective SS can be semi-statically configured and hence not necessarily changed in a dynamic manner (e.g. based on the combination of SS in a given slot). Although a possibility would be to leave this for the gNB (e.g., gNB 500) to configure the total number of BDs or CCEs for channel estimation such that it does not exceed the maximum values in any slot, such a delegation of processing could scarify the UE processing capability and limit the scheduling flexibility such as in other slots other than slot n and n+8, for example, where an overbooking beyond a threshold limit (e.g., 44 or other number) can occur. Hence, it would be desirable to introduce over-booking processes or rules of the BDs for some time instances (i.e. slot n, n+4 and n+8) so as to avoid the blind decoding restriction on other monitoring occasions where the BDs could be below the maximum number of BDs and CCEs.

In the example of FIG. 7, a UE (e.g., 400) can be configured with multiple common search spaces (CSS) 110, 120, 130 and UE-specific search space (USS) 140 and 150 with periodicity of 1/4/8 slots, respectively. For example, the CSS 110 can be every 8 slots, CSS 120 and 130 every 4 slots, and the USS 140 and 150 could be every one slot. In particular, the blind decoding attempts for each of the search spaces can be configured by higher layer signaling (e.g., radio resource control (RRC)), an indication signaled or based on one or more related priority criteria or rule. For example, the blind decoding attempts for each of the search spaces can be configured by RRC, in one example configuration, as follows: the CSS 110 (e.g. Type 0-PDCCH CSS for SI-RNTI), where 4 PDCCH candidates can be for aggregation level 4 (AL 4), and 2 for AL 8, and 1 for AL16; the CSS 120/130 can include 6 candidates for each SS, including 4 PDCCH candidates for AL 4 and 2 for AL 8; and USS 140/150 can have 16 PDCCH candidates for each SS, which can comprise 6 for AL1, 6 for AL 2, 2 for AL 4 and 2 for AL 8 (i.e., 6+6+2+2=16 candidates). Other candidate configurations could also be envisioned.

Due to the varied periodicity of PDCCH monitoring occasions, the total number of BDs in a given slot can be varied due to different combinations of SSs. In some slots (e.g. slot n and n+8), the total number of BDs could exceed the maximum BDs threshold level or number of CCEs (e.g. 44 in case of SCS=15, as illustrated in FIG. 6).

To support overbooking of the BDs and CCEs and avoid misalignment between gNB 500 and UE 400, for example, the number of BDs and CCEs of channel estimation can be reduced down to the levels in some slots in response to the corresponding values exceeding the minimum requirements or threshold level specified. The exemplary approaches, aspects or embodiments herein can be performed to drop the PDCCH candidates by the gNB 500 and skip/disregard monitoring parts of PDCCH candidates at the UE 400 by exploiting at least the nature of (or as a function of) the SS, aggregation levels or DCI types transmitted in the SS in cases when the total number of BDs or total number of CCEs across one or more SS sets in a slot exceeds the threshold value.

Embodiments herein provide various mechanisms for performing the PDCCH transmission and PDCCH monitoring. In various embodiments, the UE 400, for example, can determine whether to skip monitoring of some PDCCH candidates based at least in part on the control resource set index, aggregation levels or a combination of them.

According to various embodiments, the search spaces (SS) that the UE 400 monitors PDCCH candidates can be further categorized into CSS or UE-specific search space (USS) as demonstrated as follows so that the CSS can comprise: A Type 0-PDCCH CSS for a DCI format with CRC scrambled by a SI-RNTI on a primary cell (PCell); A Type 1-PDCCH CSS for a DCI format with CRC scrambled by a RA-RNTI on a PCell; A Type2-PDCCH CSS for a DCI format with CRC scrambled by a P-RNTI on a PCell; A Type 3-PDCCH CSS for a DCI format with CRC scrambled by INT-RNTI, or SFI-RNTI, or TPC-PUSCH-RNTI, or TPC-PUCCH-RNTI, or TPC-SRS-RNTI, or C-RNTI, or CS-RNTI(s), or TC-RNTI, or SP-CSI-RNTI; and the USS for a DCI format with CRC can be scrambled by C-RNTI, or CS-RNTI(s), or TC-RNTI, or SP-CSI-RNTI.

The following can be specified (see, TS 38.213, version 15.0.01) so that denote by $S_{css}$ a set of search space sets $s_{css}$ for common search spaces in a corresponding set $P_{css}$ of control resource sets $p_{css}$ and by $S_{uss}$ a set of search space sets $s_{uss}$ for UE-specific search spaces in a corresponding set $P_{uss}$ of control resource sets $p_{uss}$ where a UE monitors PDCCH candidates in a slot. If $$\sum_{\substack{s_{css} \in S_{css} \\ p_{css} \in P_{css}}} \sum_L M^{(L)}_{p_{css},s_{css}} + \sum_{\substack{s_{uss} \in S_{uss} \\ p_{uss} \in P_{uss}}} \sum_L M^{(L)}_{p_{uss},s_{uss}} > M^{max,slot}_{PDCCH},$$

the UE monitors $$M^{css}_{PDCCH} = \min\left(M^{max,slot}_{PDCCH}, \sum_{\substack{s_{css} \in S_{css} \\ p_{css} \in P_{css}}} \sum_L M^{(L)}_{p_{css},s_{css}}\right)$$

PDCCH candidates for the common search spaces and $M^{uss}_{PDCCH} = M^{max,slot}_{PDCCH} - M^{css}_{PDCCH}$ PDCCH candidates for UE-specific search spaces in the slot.

Various embodiments herein provide mechanisms for the dropping one or more PDCCH candidates in case the number of PDCCH candidates in the UE-specific search space within a slot duration, based on the RRC configuration of the search space set(s) provided to the UE 400, is less than $M^{uss}_{PDCCH}$.

In various embodiments, for PDCCH candidates monitoring, the K configured search spaces can be assigned priorities in a given slot based on the search space type (i.e., CSS or USS). For instance, the CSSs can have the highest priority and USSs can have a lower priority in order to ensure the delivery of broadcast or paging or RAR messages over unicast data message.

If there are multiple CSSs or USSs with a same priority in a time instance (e.g., slot n), then these search spaces can be further prioritized based on the search space set index that can be configured for each SS by higher layers, a signaled indication or a priority rule. For example, the search space set with the lower index can be prioritized for transmission over that with the higher index in consideration for dropping or skipping when the threshold has been exceeded, for example.

Additionally, or alternatively, within a given search space set, the PDCCH with a higher aggregation level (AL) can be prioritized over PDCCH candidates with lower ALs in order to ensure the robustness of PDCCH and avoid the shortage of larger AL candidates, but causing larger overhead. Additionally, or alternatively, the PDCCH with a lower AL can be monitored to minimize the blocking probability. In some embodiments, the PDCCH candidate that reduces the largest number of CCEs is dropped first in case of multiple PDCCH candidates for the selected highest or lowest AL.

In aspects herein, within a given search space set, dropping of candidates at higher ALs can be performed or configured help with reducing of the overall number of CCEs needed for channel estimation in a slot and thereby, help in meeting the CCE-budget (CCE threshold amount) for a slot to keep within the threshold value. On the other hand, dropping of candidates at lower ALs can help with prioritization of higher AL candidates and help in meeting the BD-budget (BD threshold amount) for a slot.

Thus, in various embodiments, for dropping of candidates from within a given search space set, the UE could be configured via higher layer signaling, and indication or a predefined priority rule as to whether candidates starting from highest or starting from lowest ALs are to be dropped in events of BD- or CCE-budget violation, which can be associated with the threshold value (e.g., 44 or other) for BDs and prevention of overbooking, for example.

Additionally, or alternatively, the choice between either dropping of candidates starting from the highest or lowest ALs in a slot can be implicitly determined depending on whether the CCE-budget or the BD-budget is exceeded respectively. As such, rather than receiving an RRC signal or an indication of the priority for dropping, the UE 400 can ascertain this order itself based on one or more priority criteria for a predefined priority rule, for example, or based on predefined specification criteria for priority order of dropping PDCCH candidates from being monitored in BDs for channel estimation.

In case both budgets are exceeded (the CCE and BDs causing the number of candidates for BDs to be exceeded from the threshold), a two-step mechanism for dropping of PDCCH candidates can be specified. In an example, the dropping of candidates can be specified to start with the candidates at the lowest ALs within the search space set to first reduce the number of BDs, and then, once the BD-budget is satisfied, drop the candidates at highest ALs to satisfy the CCE-budget. Such dropping rules can be defined to be used as further alternatives to or variants of one or more priority rules, as described further below with respect to FIG. 8.

In other embodiments, the number of BD candidates could never necessarily exceed the specified BD-budget per slot, and it is possible that only the CCE-budget can be exceeded, in which case the candidate dropping mechanisms described herein can be applied.

In some embodiments, the UE 400 can compute a priority or priority factor for the PDCCH candidates, for example, in order to rank them within the slot across search spaces (e.g., CSS, USS or the like). For example, the priority factor can be defined as: $\beta(p,s,L)=1/M_{p,s}^{(L)}$, wherein p is the control resource set index; s represents the search space index $0 \leq s \leq 9$; $L \in \{1,2,4,8,16\}$ is the aggregation level; $M_{p,s}^{(L)}$: number of PDCCH candidates for AL L within search space index s of control resource set p. For an AL L, if $M_{p,s}^{(L)}=0$, then $\beta(p,s,L)=1$. This priority factor definition follows the principle of starting to drop PDCCH candidates from search spaces at AL L that have the highest number of candidates configured for monitoring ($M_{p,s}^{(L)}$).

Figure 8:
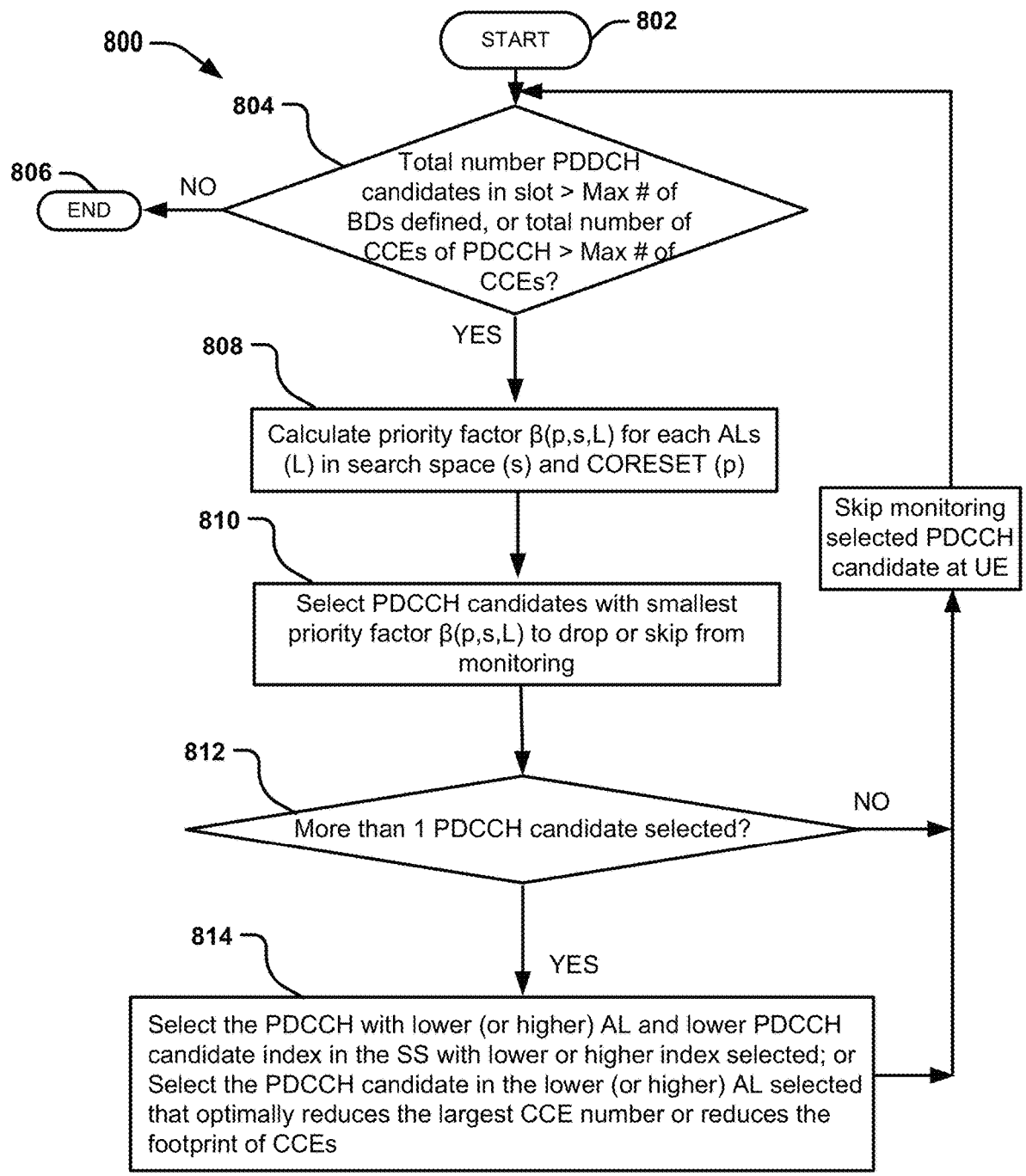
FIG. 8 is a diagram illustrating an example process flow for PDCCH candidate selection for dropping according to various aspects discussed herein.

Referring to FIG. 8, illustrated an example process flow 800 for processing, configuring, or selection of PDCCH candidates in a slot for dropping or skipping from monitoring for channel estimation.

The process flow or method 800 for selectively skipping PDCCH candidates monitoring in a multiple CORESETS and UE-specific search spaces for NR systems can be based on the priority values of a priority order. For a given slot, the PDCCH candidates can be dropped due to the slot exceeding either the maximum/threshold blind decoding or CCEs for channel estimation.

The process flow 800 initiates at 802, and at 804 comprises a decision as to whether the total number of PDCCH candidates in a particular slot exceeds a maximum or threshold number of blind decoding attempts (blind decoding budget). The threshold or maximum can be defined by the TS (e.g., as illustrated in FIG. 6), or signaled from higher layer signaling. Alternatively, or additionally, the decision can include determining whether a total number of CCEs of the PDCCH exceed a maximum number of CCEs (a CCE budget). If no, to both questions, the process flow ends at 806.

If yes, however, the process flows to 808 where a priority factor $\beta(p,s,L)$ can be calculated for each of the ALs (L) in search space (s) and CORESET (p). Then at 810, the PDCCH candidates within the smallest $\beta(p,s,L)$ across all the involved search spaces sets in this said slot can be selected first to drop from monitoring in order to satisfy the threshold levels.

At 812, if more than one PDCCH candidates is selected the process flows to 814, but if not, then the process flow is directed to 816 to skip monitoring the selected PDCCH candidate at the UE (e.g., 400).

At 814, in case of multiple PDCCH candidates with a same or different ALs were selected due to a same value of priority order, different options can be used to select the dropped PDCCH candidates, which is determined based on AL, PDCCH candidate index, search space index, CORE-SET index or a combination thereof.

In one optional embodiment at 816, the PDCCH with the lower (or higher) AL and lower (or higher) PDCCH candidate index in the SS with lower or higher index selected in the 810 can be first dropped. Alternatively, or additionally, in another second option embodiment, the PDCCH candidate in the lower AL can be selected in the act 808 that reduces the number of CCEs in the slot, i.e., reduces the footprint of CCEs the most can be dropped first.

The process flow 800 can then be iterated from 808 with re-calculating) $\beta(p,s,L)$ to select the PDCCH candidates for dropping or to skip monitoring according to the priority factor until the number of PDCCH candidates and the number of CCEs for channel estimation fit within the maximum values.

In other embodiments, a two-step approach can be followed. According to this embodiment, if both the BD-budget and the CCE-budget are exceeded, then the process flow 800 can be iterated until the number of PDCCH candidates satisfy the BD budget in a slot, and then, the procedure can be repeated but with a different priority factor (different from $\beta(p,s,L)$) or different PDCCH candidate selection rule compared to the alternative selected in 814. As an example, for the first set of iterations, the first aspect/embodiment can be used with dropping of the PDCCH candidate at lower AL or higher index, but for a second iteration or set of iterations, the second option embodiment can be performed for selecting candidates to be dropped.

In other embodiments, the priority factor can be defined as: $\theta(p,s,L)=1/(L*M_{p,s}^{(L)})$. Compared to the priority factor $\beta(p,s,L)$, the priority factor $\theta(p,s,L)$ additionally aims to incorporate the span of the $M_{p,s}^{(L)}$ candidates at AL L in terms of the number of CCEs.

Alternatively, or additionally, another embodiment can include evenly partitioning the PDCCH candidates and CCEs numbers by dividing the maximum BD/CCEs number equally among the number of involved CORESETs or Search Spaces in the slot. Each of the sub-BD/CCEs then can be further divided into the number of ALs, which can be termed as "AL proportional partition among SS" approach. For example, this can involve denoting the number of BD for AL L in a UE-specific search space $s_{uss}$ ($0 \leq s_{uss} \leq S_{uss}$) and CCEs for a CORESET $p_{uss}$ ($0 \leq p_{uss} < P_{uss}$) by $M_{p_{uss},s_{uss}}^{(L)\prime}$ and $C_{PDCCH}^{p_{uss}\prime}$ respectively. Then the scaled value of $M_{p_{uss},s_{uss}}^{(L)\prime}$ and the size of $C_{PDCCH}^{p\prime}$ is given by:

$$M_{p_{uss},s_{uss}}^{(L)\prime} = \left\lfloor \frac{M_{PDCCH}^{max,slot}}{s_{uss}} \cdot \frac{M_{p_{uss},s_{uss}}^{(L)}}{\sum_L M_{p_{uss},s_{uss}}^{(L)}} \right\rfloor ; \; C_{PDCCH}^{p_{uss}\prime} \cdot = \left\lfloor \frac{c_{PDCCH}^{p_{uss}}}{P_{uss}} \right\rfloor,$$

wherein $M_{p_{uss},s_{uss}}^{(L)}$ is the PDCCH candidates of AL L configured by RRC signaling for search space $s_{uss}$ in CORESET $p_{uss}$ before scaling; $M_{PDCCH}^{max,slot}$ denotes the maximum number of PDCCH candidates attempts in the UE-specific Search Space per slot and per serving cell; $C_{PDCCH}^{Puss}$: denotes the maximum number of CCEs for channel estimation across all the $P_{uss}$ CORESETS; $S_{uss}$: denotes the total number of UE-specific SS; $P_{uss}$: denotes the total number of CORESETS consisting of UE-specific SS.

In other embodiments, the PDCCH candidates for AL L can be determined can be represented as follows for all UE-specific search spaces:

$$M_{p_{uss},s_{uss}}^{(L)\prime} = \left\lfloor \frac{M_{p_{uss},s_{uss}}^{(L)} \cdot M_{PDCCH}^{max,slot}}{\sum_{P_{uss}} \sum_{s_{uss}} \sum_{L} M_{p_{uss},s_{uss}}^{(L)}} \right\rfloor.$$

This AL proportional partition can be less complex; However, one disadvantage is that for CORESET with small number of USS sets or CCEs for PDCCH monitoring that is configured by RRC, the UE processing capability can be wasted.

Further aspects or embodiments can include cases when the number of PDCCH candidates in the common search space within a slot duration, based on the RRC configuration of the search space set(s) provided to the UE and/or based on the configuration in the Master Information Block (MIB) carried by the NR PBCH, is less than $M_{PDCCH}^{max,slot}$.

In other embodiments, for the CSS prioritization, the UE 400 can take into account the following relative priority in decreasing order: Type 0-PDCCH CSS for a DCI format with CRC scrambled by a SI-RNTI; Type 1-PDCCH CSS for a DCI format with CRC scrambled by a RA-RNTI; Type 2-PDCCH CSS for a DCI format with CRC scrambled by a P-RNTI; Type 3-PDCCH CSS for a DCI format with CRC scrambled by INT-RNTI, or SFI-RNTI, or TPC-PUSCH-RNTI, or TPC-PUCCH-RNTI, or TPC-SRS-RNTI, or C-RNTI, or CS-RNTI(s), or TC-RNTI, or SP-CSI-RNTI.

In other words, the partition of PDCCH candidates monitoring search space sets can be determined at least based on the RNTI and a particular ordering is given as follows: SI-RNTI>RA-RNTI>P-RNTI>other RNTIs in Type3-PDCCH CSS, which means the SI-RNTI has the highest priority order.

In some other embodiments, the paging with P-RNTI can be prioritized over RA-RNTI as paging is used to inform the UE 400 about essential events such as system information changes, incoming call, and emergency message such as Earthquake & Tsunami Warning System (ETWS). Correspondingly, the priority order for CSS can be given, or configured as follows: SI-RNTI>P-RNTI>RA-RNTI 22 other RNTIs in Type3-PDCCH CSS.

In other embodiments, the paging with P-RNTI can be prioritized over SI-RNTI as follows: P-RNTI>SI-RNTI>RA-RNTI>other RNTIs in Type3-PDCCH CSS. This can be selected because P-RNTI is used to inform UE about critical information update (e.g., ETWS). While, system information can be transmitted multiple times by network and hence the UE can still acquire the system information at the next instance.

Further, in various embodiments, for any prioritization between SI-RNTI, RA-RNTI, P-RNTI, and C-RNTI, dropping of the corresponding PDCCH candidates in common search space based on RNTI prioritization can be applied for a pair of RNTIs that correspond to different PDCCH BDs, while for PDCCH candidates with different RNTIs that correspond to the same BD attempt can be treated at the same priority level.

In other embodiments, if configured to monitor for DCI format 2_0 in a slot carried by PDCCH in common search space with CRC scrambled with SFI-RNTI, the PDCCH candidates in common search space with CRC scrambled by SFI-RNTI can be always prioritized and not be dropped.

According to certain aspects, for more than one configured serving cell, when the UE 400 monitors PDCCH candidates in the slot for CSS and USS, which exceed the maximum number of PDCCH candidates or maximum CCEs for channel estimation across all CCs, a UE can skip monitoring the PDCCH with DCI format 0-0/1-0 in the USS for the secondary serving cell.

According to other aspects, for more than one active DL BWPs in a carrier, when the UE 400 monitors PDCCH candidates in a slot for CSS and USS, which exceed the maximum number of PDCCH candidates or maximum CCEs for channel estimation across all BWPs, a UE can skip monitoring the PDCCH with DCI format 0-0/1-0 in the USS for all BWPs except the active BWP with lowest BWP index.

Additionally, or alternatively, the priority order for partitioning of the PDCCH monitoring candidates can be given as follows: CC Index (e.g., lowest CC index with a higher priority)>BWP index (e.g., lowest BWP index with higher priority)>CSS>USS.

In other aspects, taking into account the importance of broadcast message over unicast data, the priority order can be determined as follows: CC Index>CSS>BWP>USS. This second option can be applied if, in case it is specified that for a UE configured with multiple active DL BWPs, the UE 400 can only be configured to monitor CSS in no more than a single active DL BWP.

According to other aspects, an explicit signaling can be the gNB 500, for example can be implemented. For example, a SS priority order can be defined and signaled per search space as part of search space configuration by higher layers. The priority rules defined above or herein can be used to determine the PDCCH monitoring candidates for SS with a same priority order. The gNB 500, for example, for example, can determine which value of priority order to signal to the terminal based on any one or a combination of these factors: search space type (i.e. CSS or USS); RNTI values configured for PDCCH monitoring; or Aggregation levels of PDCCH candidates.

In some embodiments, when the number of determined CCEs according to the number of selected PDCCH candidates exceeds the maximum CCEs of channel estimation, the CCEs associated with the PDCCH candidates with the lowest priority can be dropped until the number of CCEs for which channel estimation is to be performed by UE does not exceed the maximum CCEs number. The priority orders for the PDCCH candidates are determined using the aforementioned approaches or embodiments herein.

In other embodiments, the CCEs dropping can be at least based on the CORESET index. For example, all the PDCCH candidates in the highest or lowest CORESET can be dropped until the maximum blind decoding and CCE number requirement are both met.

Various additional aspects of the present disclosure are directed to how to treat the PDCCH candidates that have not been selected for monitoring, for the case when the number of CCEs for channel estimation has reached the maximum value but the number of PDCCH candidates for monitoring is still less than the maximum threshold.

In some embodiments, the remaining PDCCH candidates are simply not monitored by the UE for this case, which could however result in excessive PDCCH candidates dropping.

In other embodiments, to address this problem, a PDCCH candidate is transmitted if the following condition is met: all CCEs of the PDCCH candidate is fully filled in the footprint of the already selected PDCCH candidates in the CORESETs as it is not increased the number of CCEs for channel estimation.

According to other embodiments, a method for allocating the remaining PDCCH candidate can include to remap them to the REs in the footprint of the already selected PDCCH candidates in the CORESET(s) so as to avoid increasing the CCEs number. This method provides full flexibility in PDCCH candidates monitoring to always utilize the maximum PDCCH candidates.

According to other embodiments, if hierarchical search space design with the configuration of pseudo PDCCH candidates as described in [R1-1803264] is adopted to define the hashing function for UE-specific search space sets, then in case when the BD-budget or the CCE-budget in a slot is exceeded, the UE can start to drop PDCCH candidates that map to the CCEs occupied by the pseudo PDCCH candidates.

According to other embodiments, if the UE (e.g., 400) is configured with more than one PDCCH monitoring occasions within a slot according to the higher layer parameter monitoringSymbolsWithinSlot and the total number of PDCCH candidates or CCEs for channel estimation exceeds the respective maximum values defined in 3GPP specification as described earlier, the lower (or higher) monitoring instance can be given a lower priority for PDCCH candidates dropping.

Figure 9:
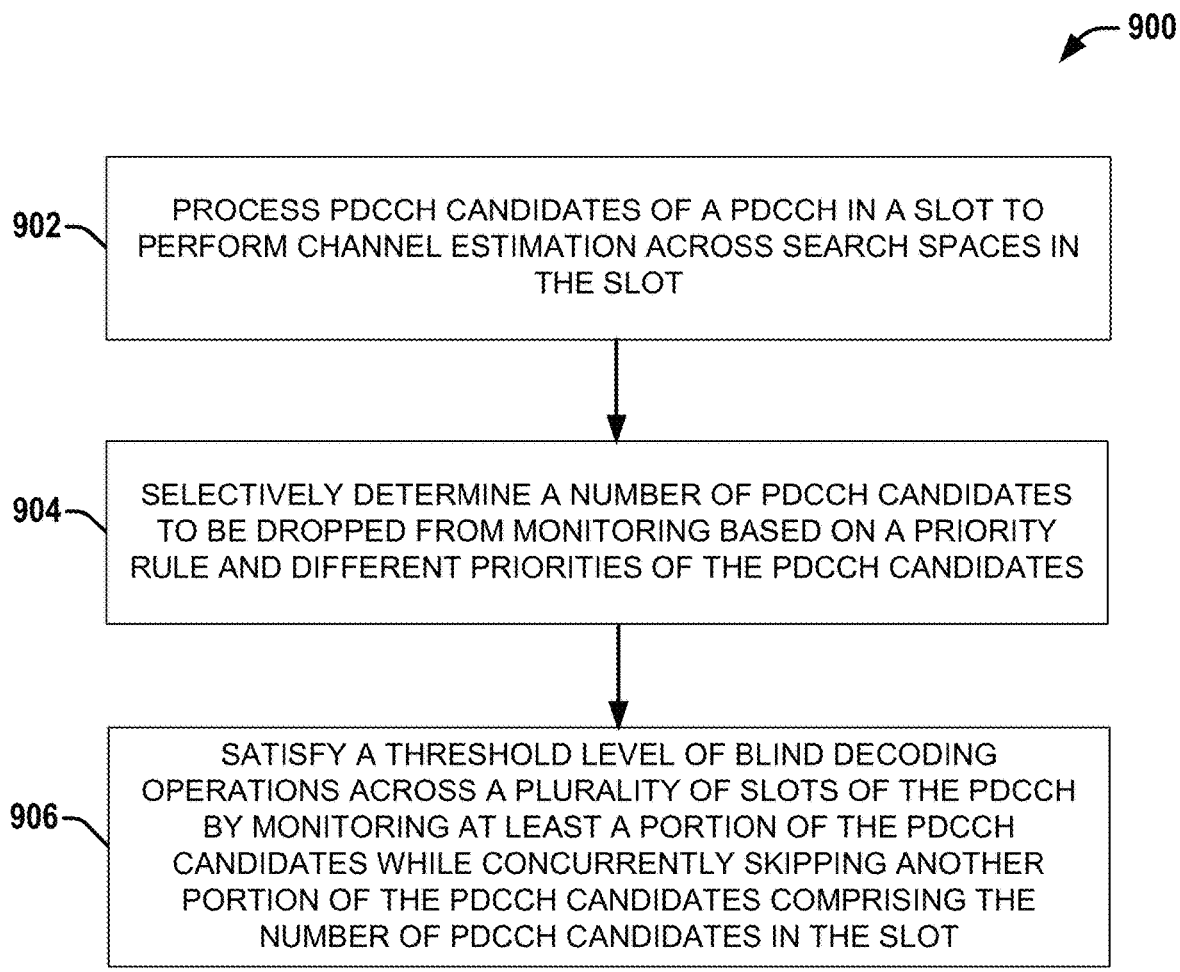
FIG. 9 is a flow diagram of an example method for configuring PDCCH candidates for being dropped or skipped from monitoring according to various aspects described herein.

Referring to FIG. 9, illustrated an example process flow 900 for processing or configuring PDCCH candidates to be dropped or skipped.

At 902, the process flow comprises processing physical downlink control channel (PDCCH) candidates of a PDCCH in a slot to perform channel estimation across search spaces in the slot.

At 904, the process flow 900 includes selectively determining a number of PDCCH candidates to be dropped from monitoring based on a priority rule and different priorities of the PDCCH candidates.

At 906, the process flow 900 includes satisfying a threshold level of blind decoding operations across a plurality of slots of the PDCCH by monitoring at least a portion of the PDCCH candidates while concurrently skipping another portion of the PDCCH candidates comprising the number of PDCCH candidates in the slot.

In other aspects, the process flow can include determining whether a total number of PDCCH candidates or a total number of control channel elements (CCEs) in the slot exceeds a predefined value for the threshold level of blind decoding operations. Priority factors can be calculated for aggregation levels in a search space and a control resource set, and based on the determination and the priority factors, the number of PDCCH candidates can be selected to be skipped to satisfy the predefined value.

In response to a blind decoding budget and a CCE budget being exceeded, selectively determining the number of PDCCH candidates to be skipped from monitoring by a two-step mechanism comprising: skipping the another portion of the PDCCH candidates starting with the PDCCH candidates at a lowest aggregation level (AL) from among the ALs of the search spaces in the slot to reduce the blind decoding operations; and skipping a PDCCH candidate at a higher AL, or a lower AL, from among the ALs of the search spaces that satisfies the CCE budget.

Figure 10:
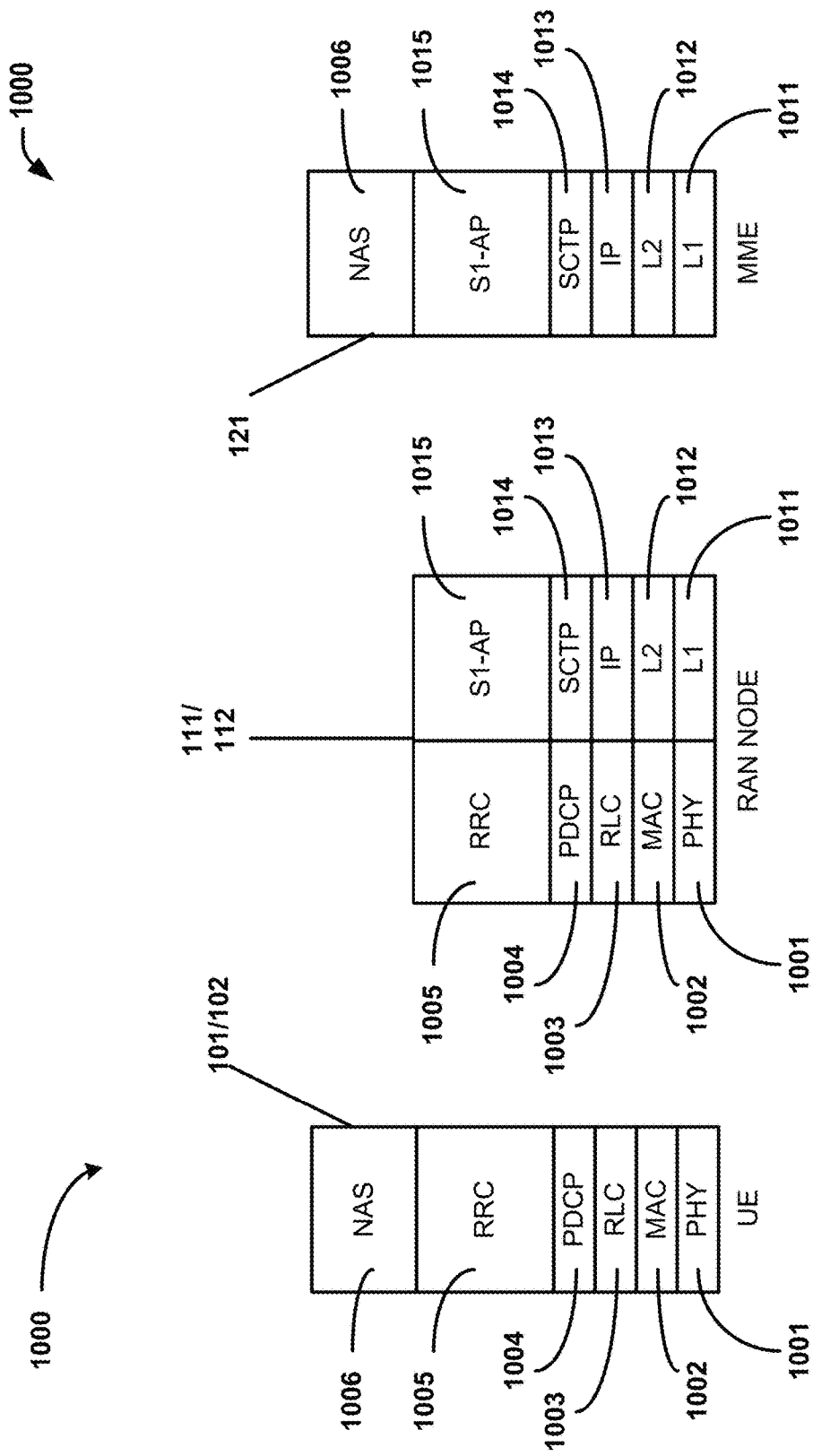
FIG. 10 illustrates a control plane protocol stack that can be implemented for operation of various embodiments and aspects described herein.

FIG. 10 is an illustration of a control plane protocol stack in accordance with various embodiments described herein. In this embodiment, a control plane 1000 is shown as a communications protocol stack between the UE 101 (or alternatively, the UE 102), the RAN node 111 (or alternatively, the RAN node 102), and the MME 121.

The PHY layer 1001 may transmit or receive information used by the MAC layer 1002 over one or more air interfaces. The PHY layer 1001 may further perform link adaptation or adaptive modulation and coding (AMC), power control, cell search (e.g., for initial synchronization and handover purposes), and other measurements used by higher layers, such as the RRC layer 1005. The PHY layer 1001 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1002 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 1003 may operate in a plurality of modes of operation, including: Transparent Mode (TM), Unacknowledged Mode (UM), and Acknowledged Mode (AM). The RLC layer 1003 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1003 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 1004 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1005 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 101 and the RAN node 111 may utilize a Uu interface (e.g., an LTE-Uu interface) to exchange control plane data via a protocol stack comprising the PHY layer 1001, the MAC layer 1002, the RLC layer 1003, the PDCP layer 1004, and the RRC layer 1005.

The non-access stratum (NAS) protocols 1006 form the highest stratum of the control plane between the UE 101 and the MME 121. The NAS protocols 1006 support the mobility of the UE 101 and the session management procedures to establish and maintain IP connectivity between the UE 101 and the P-GW 123.

The S1 Application Protocol (S1-AP) layer 1015 may support the functions of the S1 interface and comprise Elementary Procedures (EPs). An EP is a unit of interaction between the RAN node 111 and the CN 120. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 1014 may ensure reliable delivery of signaling messages between the RAN node 111 and the MME 121 based, in part, on the IP protocol, supported by the IP layer 1013. The L2 layer 1012 and the L1 layer 1011 may refer to communication links (e.g., wired or wireless) used by the RAN node and the MME to exchange information.

The RAN node 111 and the MME 121 may utilize an S1-MME interface to exchange control plane data via a protocol stack comprising the L1 layer 1011, the L2 layer 1012, the IP layer 1013, the SCTP layer 1014, and the S1-AP layer 1015.

Figure 11:
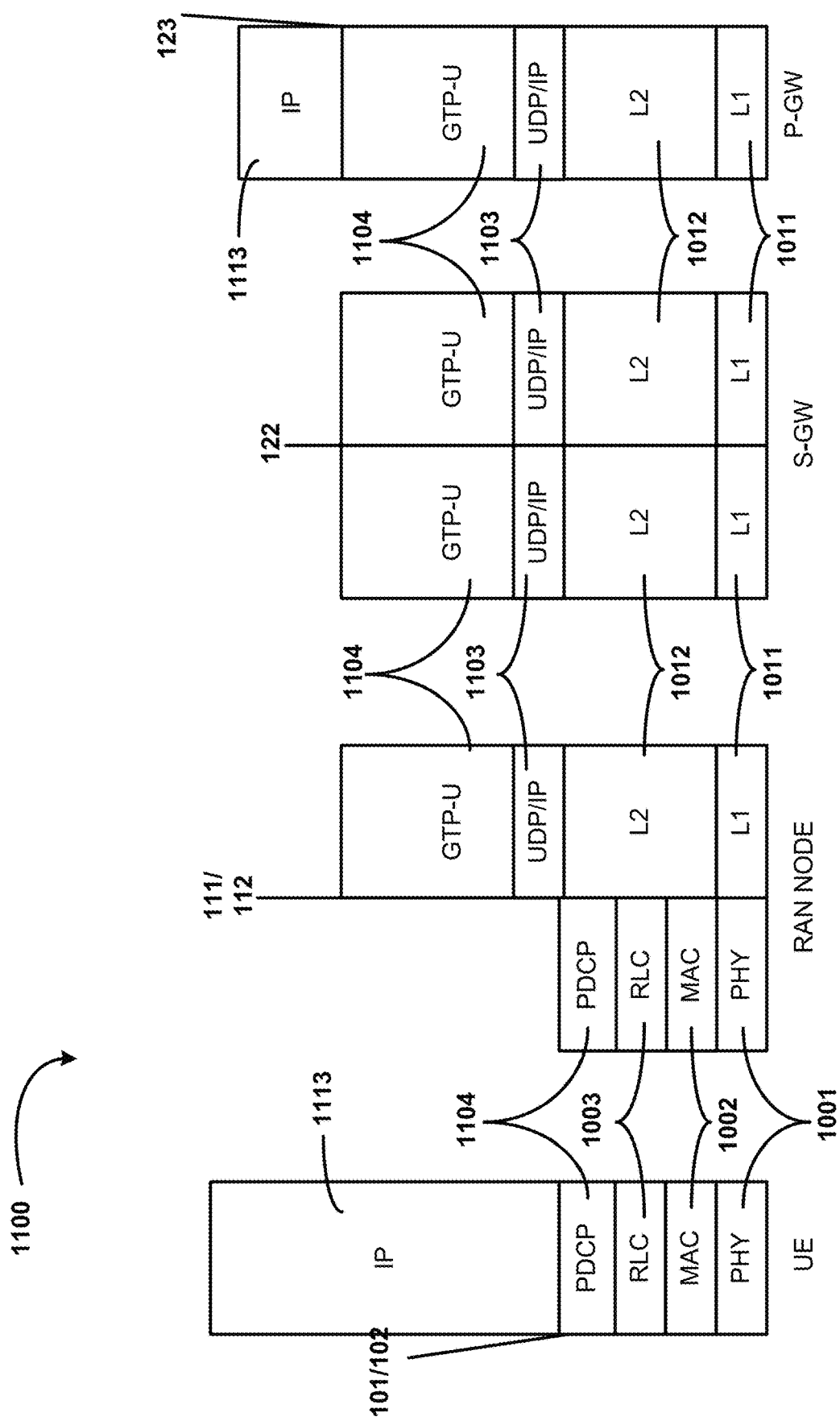
FIG. 11 illustrates user plane protocol stack that can be implemented for operation of various embodiments and aspects described herein.

FIG. 11 is an illustration of a user plane protocol stack in accordance with one or more embodiments herein. In this embodiment, a user plane 1100 is shown as a communications protocol stack between the UE 101 (or alternatively, the UE 102), the RAN node 111 (or alternatively, the RAN node 112), the S-GW 122, and the P-GW 123. The user plane 1100 may utilize at least some of the same protocol layers as the control plane 1000. For example, the UE 101 and the RAN node 111 may utilize a Uu interface (e.g., an LTE-Uu interface) to exchange user plane data via a protocol stack comprising the PHY layer 1001, the MAC layer 1002, the RLC layer 1003, the PDCP layer 1004.

The General Packet Radio Service (GPRS) Tunneling Protocol for the user plane (GTP-U) layer 1104 may be used for carrying user data within the GPRS core network and between the radio access network and the core network. The user data transported can be packets in any of IPv4, IPv6, or PPP formats, for example. The UDP and IP security (UDP/IP) layer 1103 may provide checksums for data integrity, port numbers for addressing different functions at the source and destination, and encryption and authentication on the selected data flows. The RAN node 111 and the S-GW 122 may utilize an S1-U interface to exchange user plane data via a protocol stack comprising the L1 layer 1111, the L2 layer 1012, the UDP/IP layer 1103, and the GTP-U layer 1104. The S-GW 122 and the P-GW 123 may utilize an S5/S8a interface to exchange user plane data via a protocol stack comprising the L1 layer 1011, the L2 layer 1012, the UDP/IP layer 1103, and the GTP-U layer 1104. As discussed above with respect to FIG. 10, NAS protocols support the mobility of the UE 101 and the session management procedures to establish and maintain IP connectivity between the UE 101 and the P-GW 123.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

In the subject specification, terms such as "store," "data store," "data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, nonvolatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Examples can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

Example 1 can include a method for skipping PDCCH candidates for monitoring in a radio communication system, the method comprising: Identifying or causing to identify the number of PDCCH candidates and number of CCEs for channel estimations across all search spaces sets for all the common search spaces (CSS) and UE-specific search spaces (USS) in a slot based on the higher layer configurations; and determining or causing to determine whether the total number of PDCCH candidates or total number of CCEs exceeds the maximum values defined in 3GPP specification; and upon determining either total number of PDCCH candidate or total number of CCEs exceeds the corresponding maximum value, selecting or causing to select a plurality of PDCCH candidate based on a priority rule; and skipping monitoring or causing to skip monitoring the selected PDCCH candidate in this slot which have a lower priority in according to the said priority rule.

Example 2 can include the method of example 1 and/or some other examples herein, wherein the priority rule comprises: determining or causing to determine the priority rule to select PDCCH candidates to skip monitoring at least based on the search space type i.e. CSS or USS.

Example 3 can include the method of example 2 and/or some other examples herein, wherein the CSSs can have the highest priority and USSs can have a lower priority.

Example 4 can include the method of example 3 and/or some other examples herein, wherein if there are multiple CSSs or USSs with a same priority in a time instance, then these search spaces can be further prioritized based on the search space set index that is configured for each SS by higher layers.

Example 5 can include the method of example 4 and/or some other examples herein, wherein the PDCCH with a higher aggregation level (AL) have higher priority than PDCCH candidates with lower ALs within a given search space set.

Example 6 can include the method of example 4 and/or some other examples herein, wherein the PDCCH with a lower aggregation level (AL) have higher priority than PDCCH candidates with higher ALs within a given search space set.

Example 7 can include the method of example 4 and/or some other examples herein, wherein the priority order is configured by higher layer signaling with respect to starting from highest or starting from lowest ALs for PDCCH candidates dropping.

Example 8 can include the method of example 1 and/or some other examples herein, wherein further comprising a 2-step mechanism for dropping of PDCCH candidates comprising: dropping or causing to drop candidates can be specified to start with the candidates at the lowest ALs within the search space set to first reduce the number of BDs, and when the BD-budget is satisfied, dropping or causing to drop the PDCCH candidate at highest ALs to satisfy the CCE-budget.

Example 9 can include the method of example 1 and/or some other examples herein, further comprising: computing or causing to compute a priority factor for each PDCCH candidate in the USS; skipping monitoring or causing to skip monitoring a set of PDCCH candidates in a multiple CORESETS and UE-specific search spaces selected at least based on the values of the said priority order; and iterating or causing to iterate from the first step with re-calculating priority factor to select the PDCCH candidates for dropping or skip monitoring until the number of PDCCH candidates and the number of CCEs for channel estimation fit within the maximum values.

Example 10 can include the method of example 9 and/or some other examples herein, wherein the priority factor is defined as $\beta(p,s,L)=1/M_{p,s}^{(L)}$, wherein p is the control resource set index; s represents the search space index $0 \leq s \leq 9$; $L \in \{1,2,4,8,16\}$ is the aggregation level; and $M_{p,s}^{(L)}$: number of PDCCH candidates for AL L within search space index s of control resource set p. For an AL L, if $M_{p,s}^{(L)}=0$, then $\beta(p,s,L)=1$.

Example 11 can include the method of example 10 and/or some other examples herein, wherein the PDCCH candidates within the smallest $\beta(p,s,L)$ across all the involved search spaces sets in this said slot were selected.

Example 12 can include the method of example 11 and/or some other examples herein, wherein if multiple PDCCH candidates with a same or different ALs were selected due to a same value of priority order, selecting the dropped PDCCH candidates at least based on aggregation levels (ALs), PDCCH candidate index, search space index, CORESET index or a combination of them.

Example 13 can include the method of example 12 and/or some other examples herein, wherein the PDCCH candidate with lower (or higher) AL and lower (or higher) PDCCH candidate index in the SS with lower or higher index were selected for dropping.

Example 14 can include the method of example 12 and/or some other examples herein, wherein the PDCCH candidate in the lower AL that reduces the largest number of CCEs in the slot was selected for dropping.

Example 15 can include the method of example 9 and/or some other examples herein, wherein the priority factor is defined as $\theta(p,s,L)=1/(L*M_{p,s}^{(L)})$, wherein L denotes the AL value of PDCCH candidate.

Example 16 can include the method of example 1 and/or some other examples herein, further comprising: determining or causing to determine the BDs for a search space based on PDCCH candidates of all USS configured by RRC signaling and the maximum number of PDCCH candidates attempts in the UE-specific Search Space per slot; and determining or causing to determine the maximum number of CCEs for channel estimation for this said search space based on all CCEs across all the USS CRESETs and the maximum number of CCEs defined in specification.

Example 17 can include the method of example 16 and/or some other examples herein, wherein:

$$M_{p_{uss},s_{uss}}^{(L)\prime} = \left\lfloor \frac{M_{PDCCH}^{max,slot}}{s_{uss}} \cdot \frac{M_{p_{uss},s_{uss}}^{(L)}}{\sum_L M_{p_{uss},s_{uss}}^{(L)}} \right\rfloor; C_{PDCCH}^{p_{uss}\prime} = \left\lfloor \frac{C_{PDCCH}^{p_{uss}}}{P_{uss}} \right\rfloor,$$

wherein $M_{p_{uss},s_{uss}}^{(L)}$ is the PDCCH candidates of AL L configured by RRC signaling for search space $s_{uss}$ in CORESET $p_{uss}$ before scaling; $M_{PDCCH}^{max,slot}$ denote the maximum number of PDCCH candidates attempts in the UE-specific Search Space per slot and per serving cell; $C_{PDCCH}^{p_{uss}}$ denotes the maximum number of CCEs for channel estimation across all the $P_{uss}$ CORESETS; $S_{uss}$ is the total number of UE-specific SS; $M_{p_{uss},s_{uss}}^{(L)\prime}$ is the actual number of blind decoding for USS $s_{uss}$; $C_{PDCCH}^{p_{uss}\prime}$ is the actual number of CCEs for channel estimation for USS $s_{uss}$.

Example 18 can include the method of example 16 and/or some other examples herein, wherein:

$$M_{p_{uss},s_{uss}}^{(L)\prime} = \left\lfloor \frac{M_{p_{uss},s_{uss}}^{(L)} \cdot M_{PDCCH}^{max,slot}}{\sum_{P_{uss}} \sum_{s_{uss}} \sum_L M_{p_{uss},s_{uss}}^{(L)}} \right\rfloor.$$

Example 18.5 can include the method of example 18 and/or some other examples herein, wherein $M_{p_{uss},s_{uss}}^{(L)}$ is the PDCCH candidates of AL L configured by RRC signaling for search space $s_{uss}$ in CORESET $p_{uss}$ before scaling; $M_{PDCCH}^{max,slot}$ denote the maximum number of PDCCH candidates attempts in the UE-specific Search Space per slot and per serving cell; $S_{uss}$ is the total number of UE-specific SS; and $M_{p_{uss},s_{uss}}^{(L)'}$ is the actual number of blind decoding for USS $s_{uss}$.

Example 19 can include the method of example 1 and/or some other examples herein, wherein UE shall take into account the following relative priority in decreasing order for CSS:Type0-PDCCH CSS for a DCI format with CRC scrambled by a SI-RNTI; Type1-PDCCH CSS for a DCI format with CRC scrambled by a RA-RNTI; Type2-PDCCH CSS for a DCI format with CRC scrambled by a P-RNTI; Type3-PDCCH CSS for a DCI format with CRC scrambled by INT-RNTI, or SFI-RNTI, or TPC-PUSCH-RNTI, or TPC-PUCCH-RNTI, or TPC-SRS-RNTI, or C-RNTI, or CS-RNTI(s), or TC-RNTI, or SP-CSI-RNTI.

Example 20 can include the method of example 1 and/or some other examples herein, wherein the CSS comprises: SI-RNTI>P-RNTI>RA-RNTI>other RNTIs in Type3-PDCCH CSS.

Example 21 can include the method of example 1 and/or some other examples herein, wherein, for carrier aggregation (CA) case, CC Index (lowest CC index has higher priority)>BWP index (lowest BWP index has higher priority)>CSS>USS.

Example 22 can include the method of example 1 and/or some other examples herein, wherein, for carrier aggregation (CA) case, CC Index>CSS>BWP>USS.

Example 23 is an apparatus configured to be employed in a User Equipment (UE) for new radio (NR) communications comprising: one or more processors configured to: receive physical downlink control channel (PDCCH) candidates of a PDCCH in a slot to perform channel estimation across search spaces of the slot; determine different priorities among the PDCCH candidates in the slot based on a priority rule; selectively determine a number of PDCCH candidates to be skipped from monitoring based on the different priorities of the PDCCH candidates to ensure that a threshold level of blind decoding operations across a plurality of slots of the PDCCH is being satisfied; and monitor a portion of the PDCCH candidates while concurrently skipping another portion of the PDCCH candidates comprising the number of PDCCH candidates in the slot; a radio frequency (RF) interface, configured to provide, to RF circuitry, data for processing the PDCCH candidates.

Example 24 includes the subject matter of Example 23, wherein the one or more processors are further configured to: generate a determination of whether a total number of PDCCH candidates or a total number of control channel elements (CCEs) in the slot exceeds a predefined value for the threshold level of blind decoding operations; and based on the determination, select the number of PDCCH candidates to be skipped to satisfy the predefined value.

Example 25 includes the subject matter of any one of Examples 23-24, wherein the priority rule comprises a set of criteria comprising one or more of: a search space type from among the search spaces comprising a common search space (CSS) and a UE-specific search space (USS), an aggregation level (AL), a predefined priority order, a PDCCH candidate index, a search space index, a component carrier (CC) index, or a bandwidth part index, for determining the priorities of the PDCCH candidates.

Example 26 includes the subject matter of any one of Examples 23-25, wherein the priority rule indicates that CSSs of the search spaces comprise a higher priority than USSs of the search spaces in the slot.

Example 27 includes the subject matter of any one of Examples 23-26, wherein the one or more processors are further configured to: prioritize the search spaces according to a search space index configured for the search spaces by a higher layer signaling in response to the priorities comprising a plurality of CSSs or a plurality of USSs with a same priority.

Example 28 includes the subject matter of any one of Examples 23-27, wherein the one or more processors are further configured to: determine the priorities of the PDCCH candidates in the slot based on a higher layer signaling providing that a lower AL, or a higher AL, for PDCCH candidates are dropped from monitoring first in a priority order.

Example 29 includes the subject matter of any one of Examples 23-28, wherein the one or more processors are further configured to: selectively determine the number of PDCCH candidates to be skipped from monitoring by a two-step mechanism comprising: starting with the PDCCH candidates at a lowest AL, or a highest AL, from among the ALs of the search spaces in the slot to reduce the blind decoding operations; and in response to a blind decoding budget or the threshold level of blind decoding operations being satisfied, skipping a PDCCH candidate at a highest AL, or a lowest AL, from among the ALs of the search spaces to satisfy a CCE budget.

Example 30 includes the subject matter of any one of Examples 23-29, wherein the one or more processors are further configured to: compute a priority factor for the PDCCH candidates in a USS of the search spaces; skip from monitoring a subset of the PDCCH candidates in a plurality of control CORESETS and UE-specific search spaces of the search spaces that is selected based on priority values of a priority order of a set of criteria; and iterate with re-calculating priority factors to select the PDCCH candidates to skip from monitoring until a total number of PDCCH candidates and a number of CCEs in the slot for channel estimation fit within a predefined value for the threshold level of blind decoding operations.

Example 31 includes the subject matter of any one of Examples 23-30, wherein the priority factor is based on a control resource set index, a search space index, an aggregation level from a defined aggregation level set and the PDCCH candidates for the aggregation level within the search space index of the control resource set.

Example 32 includes the subject matter of any one of Examples 23-31,wherein the one or more processors are further configured to: skip the number of PDCCH candidates from monitoring that are within a lower priority value range across the search spaces in the slot than other PDDCH candidates, wherein the lower priority value range is based on an inverse of a total number of PDCCH candidates for an aggregation level within a search space index of a control resource set.

Example 33 is an apparatus configured to be employed in a next generation NodeB (gNB) for new radio (NR) communications comprising: one or more processors configured to: configure physical downlink control channel (PDCCH) in different search spaces independently from one another in a slot for monitoring; reduce a number of blind decoding attempts and control channel elements (CCEs) for channel estimation in the slot to satisfy a threshold level of blind decoding attempts across a plurality of slots; a radio frequency (RF) interface, configured to provide, to RF circuitry, data for a transmission of the PDCCH.

Example 34 includes the subject matter of Example 33, wherein the one or more processors are further configured to: reduce the number of blind decoding attempts and the CCEs in the slot by dropping a number of PDCCH candidates of the PDCCH based on at least one of: a type of search space, an aggregation level, or a data control information (DCI) format in the search space, in response to a total number of blind decoding attempts or CCEs across one or more search spaces in a slot exceeding the threshold level.

Example 35 includes the subject matter of any one of Examples 33-34, wherein the one or more processors are further configured to: generate an indication of a priority order for dropping PDCCH candidates within a search space of the slot in response to a total number of blind decoding attempts or CCEs across one or more search spaces in a slot exceeding the threshold level.

Example 36 includes the subject matter of any one of Examples 33-35, wherein the indication indicates that the priority order starts from a highest AL to a lowest AL, or from the lowest AL to the highest AL, for determining which of the PDCCH candidates to drop first.

Example 37 includes the subject matter of any one of Examples 33-36, wherein the priority order is based on an order of types of radio network temporary identifiers for common search spaces in the slot.

Example 38 includes the subject matter of any one of Examples 33-37, wherein the priority order is based on an order of a search space type in the slot, the search space types comprising a common search spaces (CCSs) and a UE-specific search (USS) space.

Example 39 is a computer readable storage device storing executable instructions that, in response to execution, cause one or more processors of a user equipment (UE) to perform operations, the operations comprising: processing physical downlink control channel (PDCCH) candidates of a PDCCH in a slot to perform channel estimation across search spaces in the slot; selectively determining a number of PDCCH candidates to be dropped from monitoring based on a priority rule and different priorities of the PDCCH candidates; and satisfying a threshold level of blind decoding operations across a plurality of slots of the PDCCH by monitoring at least a portion of the PDCCH candidates while concurrently skipping another portion of the PDCCH candidates comprising the number of PDCCH candidates in the slot.

Example 40 includes the subject matter of Example 39, wherein the operations further comprise: determining whether a total number of PDCCH candidates or a total number of control channel elements (CCEs) in the slot exceeds a predefined value for the threshold level of blind decoding operations; calculating priority factors for aggregation levels in a search space and a control resource set; based on the determination and the priority factors, selecting the number of PDCCH candidates to be skipped to satisfy the predefined value.

Example 41 includes the subject matter of any one of Examples 39-40, wherein the operations further comprise: in response to a blind decoding budget and a CCE budget being exceeded, selectively determining the number of PDCCH candidates to be skipped from monitoring by a two-step mechanism comprising: skipping the another portion of the PDCCH candidates starting with the PDCCH candidates at a lowest aggregation level (AL) from among the ALs of the search spaces in the slot to reduce the blind decoding operations; and skipping a PDCCH candidate at a higher AL, or a lower AL, from among the ALs of the search spaces that satisfies the CCE budget.

Example 42 includes the subject matter of any one of Examples 39-41, wherein the priority rule indicates that a PDCCH candidate with a lower AL or a higher AL than other PDCCH candidates of the PDCCH candidates, and further that a lower PDCCH candidate index or a higher PDCCH candidate index in a search space of the slot is selected first for dropping; or wherein that the PDCCH candidate in the lower AL that reduces the largest number of CCEs in the slot is to be selected for dropping.

Example 43 includes the subject matter of any one of Examples 39-42, wherein the operations further comprise: determining a number of blind decoding (BD) attempts for a search space based on the PDCCH candidates of UE-specific search spaces (USSs) in the slot that are configured by a radio resource control (RRC) signaling and a maximum number of PDCCH candidates in the USSs per slot; and determining a number of CCEs for channel estimation in the search space based on CCEs across USS control resource sets (CORESETs) and a predefined maximum number of CCEs.

Example 44 includes the subject matter of any one of Examples 39-43, wherein the priority rule comprises a priority order to take into account for selectively determining the number of PDCCH candidates to be dropped from monitoring, the priority order comprising: a decreasing order for CSS comprising: Type 0-PDCCH CSS for a DCI format with CRC scrambled by a SI-RNTI Type 1-PDCCH CSS for a DCI format with CRC scrambled by a random access (RA) radio network temporary identifier (RNTI) (RA-RNTI)>Type 2-PDCCH CSS for a DCI format with CRC scrambled by a paging RNTI (P-RNTI)>Type 3-PDCCH CSS for a DCI format with CRC scrambled by an interruption RNTI (INT-RNTI), a slot format indication RNTI (SFI-RNTI), transmit power control (TPC) physical uplink shared channel (PUSCH) RNTI (TPC-PUSCH-RNTI), TPC-physical uplink control channel PUCCH) RNTI, TPC-sounding reference signal (SRS)-RNTI, a cell RNTI (C-RNTI), a configured scheduling RNTI (CS-RNTI), temporary cell RNTI (TC-RNTI), or a semi-persistent channel state information RNTI (SP-CSI-RNTI).

Example 45 includes the subject matter of any one of Examples 39-44, wherein the priority rule comprises a priority order to take into account for selectively determining the number of PDCCH candidates to be dropped from monitoring, the priority order comprising: a carrier component (CC) Index>bandwidth part (BWP) index>CSS>USS.

Examples can include one or more non-transitory computer-readable media comprising instructions to cause an electronic device, upon execution of the instructions by one or more processors of the electronic device, to perform one or more elements of a method described in or related to any of examples above, or any other method or process described herein.

Examples can include an apparatus comprising logic, modules, or circuitry to perform one or more elements of a method described in or related to any of examples above, or any other method or process described herein.

Examples can include a method, technique, or process as described in or related to any of examples above, or portions or parts thereof.

Examples can include an apparatus comprising: one or more processors and one or more computer readable media comprising instructions that, when executed by the one or more processors, cause the one or more processors to perform the method, techniques, or process as described in or related to any of examples above, or portions thereof.

Examples can include a method of communicating in a wireless network as shown and described herein.

Examples can include a system for providing wireless communication as shown and described herein.

Examples can include a device for providing wireless communication as shown and described herein.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.14 (Wi-Fi), IEEE 802.16 (WiMAX), IEEE 802.18, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. An apparatus configured to be employed in a User Equipment (UE) for new radio (NR) communications comprising:
one or more processors configured to:
receive physical downlink control channel (PDCCH) candidates of a PDCCH in a slot to perform channel estimation across search spaces of the slot;
determine different priorities among the PDCCH candidates in the slot based on a priority rule;
selectively determine a number of PDCCH candidates to be skipped from monitoring based on the different priorities of the PDCCH candidates to ensure that a threshold level of blind decoding operations across a plurality of slots of the PDCCH is being satisfied, wherein a choice between either dropping the PDCCH candidates by starting from a highest aggregation level (AL) or a lowest AL is based on whether a control channel element (CCE) budget is exceeded, a blind decoding budget is exceeded, and both a CCE budget and a blind decoding budget is exceeded; and
monitor a portion of the PDCCH candidates while concurrently skipping another portion of the PDCCH candidates comprising the number of PDCCH candidates in the slot; and
a radio frequency (RF) interface, configured to provide, to RF circuitry, data for processing the PDCCH candidates.

2. The apparatus of claim 1, wherein the one or more processors are further configured to:
generate a determination of whether a total number of PDCCH candidates or a total number of control channel elements (CCEs) in the slot exceeds a predefined value for the threshold level of blind decoding operations; and
based on the determination, select the number of PDCCH candidates to be skipped to satisfy the predefined value.

3. The apparatus of claim 1, wherein the priority rule comprises a set of criteria comprising one or more of: a search space type from among the search spaces comprising a common search space (CSS) and a UE-specific search space (USS), an AL, a predefined priority order, a PDCCH candidate index, a search space index, a component carrier (CC) index, or a bandwidth part index, for determining the different priorities of the PDCCH candidates.

4. The apparatus of claim 1, wherein the priority rule indicates that CSSs of the search spaces comprise a higher priority than USSs of the search spaces in the slot.

5. The apparatus of claim 1, wherein the one or more processors are further configured to:
prioritize the search spaces according to a search space index configured for the search spaces by a higher layer signaling in response to the different priorities comprising a plurality of CSSs or a plurality of USSs with a same priority.

6. The apparatus of claim 1, wherein the one or more processors are further configured to:
determine the different priorities of the PDCCH candidates in the slot based on a higher layer signaling providing that a lower AL, or a higher AL, for PDCCH candidates are dropped from monitoring first in a priority order.

7. The apparatus of claim 1, wherein the one or more processors are further configured to:
in response to the blind decoding budget and the CCE budget both being exceeded, selectively determine the number of PDCCH candidates to be skipped from monitoring by a two-step mechanism comprising:
starting with the PDCCH candidates at the lowest AL from among ALs of the search spaces in the slot to reduce the blind decoding operations; and
in response to a blind decoding budget or the threshold level of blind decoding operations being satisfied, skipping a PDCCH candidate at the highest AL from among the ALs of the search spaces to satisfy a CCE budget.

8. The apparatus of claim 1, wherein the one or more processors are further configured to:
compute a priority factor for the PDCCH candidates in a USS of the search spaces;
skip from monitoring a subset of the PDCCH candidates in a plurality of control CORESETS and UE-specific search spaces of the search spaces that is selected based on priority values of a priority order of a set of criteria; and
iterate with re-calculating priority factors to select the PDCCH candidates to skip from monitoring until a total number of PDCCH candidates and a number of CCEs in the slot for channel estimation fit within a predefined value for the threshold level of blind decoding operations.

9. The apparatus of claim 8, wherein the priority factor is based on a control resource set index, a search space index, an aggregation level from a defined aggregation level set and the PDCCH candidates for the aggregation level within the search space index of a control resource set.

10. The apparatus of claim 1, wherein the one or more processors are further configured to:
skip the number of PDCCH candidates from monitoring that are within a lower priority value range across the search spaces in the slot than other PDDCH candidates, wherein the lower priority value range is based on an inverse of a total number of PDCCH candidates for an aggregation level within a search space index of a control resource set.

11. A computer readable storage device storing executable instructions that, in response to execution, cause one or more processors of a user equipment (UE) to perform operations, the operations comprising:
processing physical downlink control channel (PDCCH) candidates of a PDCCH in a slot to perform channel estimation across search spaces in the slot;
selectively determining a number of PDCCH candidates to be dropped from monitoring based on a priority rule and different priorities of the PDCCH candidates, wherein a choice between either dropping the PDCCH candidates by starting from a highest aggregation level (AL) or a lowest AL is based on whether a control channel element (CCE) budget is exceeded, a blind decoding budget is exceeded, and both a CCE budget and a blind decoding budget is exceeded; and
satisfying a threshold level of blind decoding operations across a plurality of slots of the PDCCH by monitoring at least a portion of the PDCCH candidates while concurrently skipping another portion of the PDCCH candidates comprising the number of PDCCH candidates in the slot.

12. The computer readable storage device of claim 11, wherein the operations further comprise:
determining whether a total number of PDCCH candidates or a total number of CCEs in the slot exceeds a predefined value for the threshold level of blind decoding operations;
calculating priority factors for aggregation levels in a search space and a control resource set; and
based on the determination and the priority factors, selecting the number of PDCCH candidates to be skipped to satisfy the predefined value.

13. The computer readable storage device of claim 11, wherein the operations further comprise:
in response to the blind decoding budget and the CCE budget both being exceeded, selectively determining the number of PDCCH candidates to be skipped from monitoring by a two-step mechanism comprising:
skipping the another portion of the PDCCH candidates starting with the PDCCH candidates at the lowest AL from among ALs of the search spaces in the slot to reduce the blind decoding operations before the CCE budget; and
skipping a PDCCH candidate at a higher AL from among the ALs of the search spaces that satisfies the CCE budget.

14. The computer readable storage device of claim 11, wherein the priority rule indicates that a PDCCH candidate with a lower AL or a higher AL than other PDCCH candidates of the PDCCH candidates, and further that a lower PDCCH candidate index or a higher PDCCH candidate index in a search space of the slot is selected first for dropping; or
wherein that the PDCCH candidate in the lower AL that reduces a largest number of CCEs in the slot is to be selected for dropping.

15. The computer readable storage device of claim 11, wherein the operations further comprise:
determining a number of blind decoding (BD) attempts for a search space based on the PDCCH candidates of UE-specific search spaces (USSs) in the slot that are configured by a radio resource control (RRC) signaling and a maximum number of PDCCH candidates in the USSs per slot; and
determining a number of CCEs for channel estimation in the search space based on CCEs across USS control resource sets (CORESETs) and a predefined maximum number of CCEs.

16. The computer readable storage device of claim 11, wherein the priority rule comprises a priority order to take into account for selectively determining the number of PDCCH candidates to be dropped from monitoring, the priority order comprising:
a decreasing order for CSS comprising: Type 0-PDCCH CSS for a DCI format with cyclic redundancy check (CRC) scrambled by a SI-RNTI>Type 1-PDCCH CSS for a downlink control information (DCI) format with CRC scrambled by a random access (RA) radio network temporary identifier (RNTI)(RA-RNTI)>Type 2-PDCCH CSS for a DCI format with CRC scrambled by a paging RNTI (P-RNTI)>Type 3-PDCCH CSS for a DCI format with CRC scrambled by an other RNTI, wherein the other RNTI comprises an interruption RNTI (INT-RNTI), a slot format indication RNTI (SFI-RNTI), transmit power control (TPC) physical uplink shared channel (PUSCH) RNTI (TPC-PUSCH-RNTI), TPC-physical uplink control channel PUCCH) RNTI, TPC-sounding reference signal (SRS)-RNTI, a cell RNTI (C-RNTI), a configured scheduling RNTI (CS-RNTI), temporary cell RNTI (TC-RNTI), or a semi-persistent channel state information RNTI (SP-CSI-RNTI).

17. The computer readable storage device of claim 11, wherein the priority rule comprises a priority order to take into account for selectively determining the number of PDCCH candidates to be dropped from monitoring, the priority order comprising: a decreasing order for the PDCCH candidates comprising: a carrier component (CC) Index>bandwidth part (BWP) index>CSS>USS.

18. The computer readable storage device of claim 11, wherein in response to common search spaces (CSSs) or UE-specific search spaces (USSs) of the slot having a same priority in a time instance, the CSSs or USSs are further prioritized based on a search space set index that is configured for the search spaces by one or more higher layers.

19. The computer readable storage device of claim 18, wherein the PDCCH candidates with a lower aggregation level (AL) have higher priority than the PDCCH candidates with higher ALs within a search space set.

20. The computer readable storage device of claim 11, wherein the operations further comprise:
selecting the PDCCH candidates to be dropped based on at least one of: an aggregation level (AL), a PDCCH candidate index, a search space index, or a control resource set (CORESET) index, in response to the PDCCH candidates including a same or different ALs being selected due to a same value of priority order.

21. The computer readable storage device of claim 20, wherein the operations further comprise:
selecting a PDCCH candidate with a lower or a higher AL, and a lower or higher PDCCH candidate index in a search space with a lower or a higher index to drop from monitoring.

22. The computer readable storage device of claim 20, wherein the operations further comprise:
selecting a PDCCH candidate in a lower AL that reduces a largest number of CCEs in the slot to drop from monitoring.

23. The computer readable storage device of claim 11, wherein the operations further comprise:
- computing a priority factor for the PDCCH candidates in a USS;
- skipping monitoring a set of PDCCH candidates in a plurality of CORESETS and USSs selected at least based on values of a priority order; and
- iterating from re-calculating the priority factor to select the PDCCH candidates for dropping or skipping monitoring until the number of PDCCH candidates and a number of CCEs for channel estimation are within maximum values.

* * * * *